(12) United States Patent
Brown et al.

(10) Patent No.: US 7,752,732 B2
(45) Date of Patent: Jul. 13, 2010

(54) ANCHORING FASTENER WITH MOVABLE BINDING MEMBER AND METHOD FOR ANCHORING AN OBJECT

(75) Inventors: Brian A. Brown, Alamo, CA (US); Gregory A. M. Brown, Danville, CA (US); Lawrence G. Brown, Walnut Creek, CA (US)

(73) Assignee: International Patent Development Group, LLC, Alamo, CA (US)

( * ) Notice: Subject to any disclaimer, the term of this patent is extended or adjusted under 35 U.S.C. 154(b) by 42 days.

(21) Appl. No.: 11/747,093

(22) Filed: May 10, 2007

(65) Prior Publication Data

US 2008/0199275 A1    Aug. 21, 2008

Related U.S. Application Data

(60) Provisional application No. 60/802,045, filed on May 18, 2006.

(51) Int. Cl.
    *B21J 15/02*    (2006.01)
    *F16B 21/00*    (2006.01)
(52) U.S. Cl. .................................. 29/525.05; 411/340
(58) Field of Classification Search .............. 29/525.05, 29/525.06, 432, 505, 524.1, 525.01, 525.11; 411/340, 344, 45, 62, 41, 44, 46, 48
See application file for complete search history.

(56) References Cited

U.S. PATENT DOCUMENTS

| | | |
|---|---|---|
| 1,452,514 A | 1/1923 | Karitzky |
| 3,431,813 A | 3/1969 | Johnson |
| 3,550,499 A | 12/1970 | Eilenberger |
| 3,983,779 A | 10/1976 | Dimas |
| 4,022,100 A | 5/1977 | Johnson |
| 4,181,061 A | 1/1980 | McSherry |
| 4,289,062 A | 9/1981 | Schiefer |
| 4,322,194 A | 3/1982 | Einhorn |
| 4,500,238 A | 2/1985 | Vassiliou |
| 4,662,808 A | 5/1987 | Camilleri |
| 4,902,179 A | 2/1990 | Harker |
| 5,221,167 A | 6/1993 | Girkin |
| 5,224,805 A | 7/1993 | Moretti |
| 5,447,005 A | 9/1995 | Giannuzzi |
| 6,435,789 B2 | 8/2002 | Gaudron |
| 6,494,653 B2 | 12/2002 | Remmers |

*Primary Examiner*—John C Hong
(74) *Attorney, Agent, or Firm*—David Pressman

(57) ABSTRACT

A compact wall fastener (200) comprises pivotably connected proximal and distal sections where the proximal section has a through hole (205). The distal and proximal sections (220, 222, 235) preferably are flat. The distal section has a cam follower surface (251), a point (240), and a raised portion (250) that has the cam follower surface. The fastener is driven into a wallboard (600) until its proximal surface is parallel to the surface (605) of the wallboard. An activating pin or screw (615) is inserted into the entry of the fastener and forced into contact with the cam follower and then past the raised portion, forcing the distal section to bend, thereby causing the distal section to rotate downward until it is in contact with the inside surface (610) of the wallboard. The result is a secure fastener with minimal damage to the wallboard. In addition, the fastener can be used to fasten layers of delicate or easily displaced materials (1305, 1306, 1307). The fastener can be activated by a tool (1360) that applies the activating force to the fastener only, and not the material surrounding it.

20 Claims, 37 Drawing Sheets

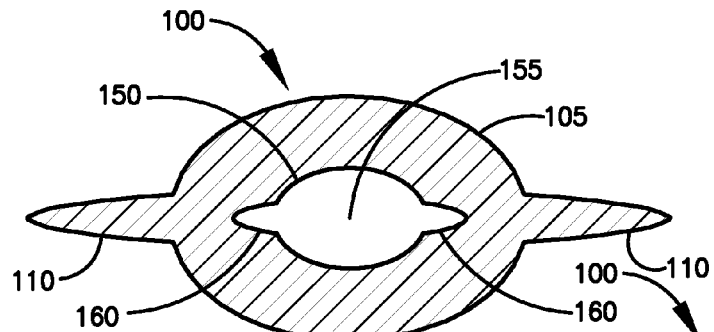
FIG. 1C-A
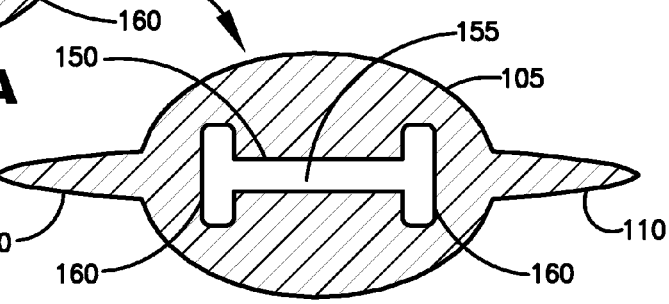
FIG. 1C-B
FIG. 1C-C
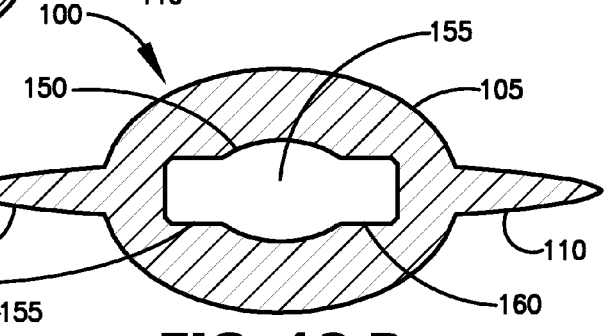
FIG. 1C-D
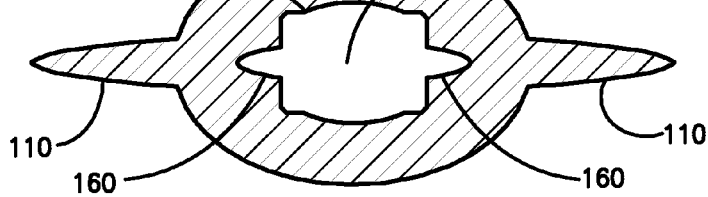
FIG. 1C-E
Prior Art

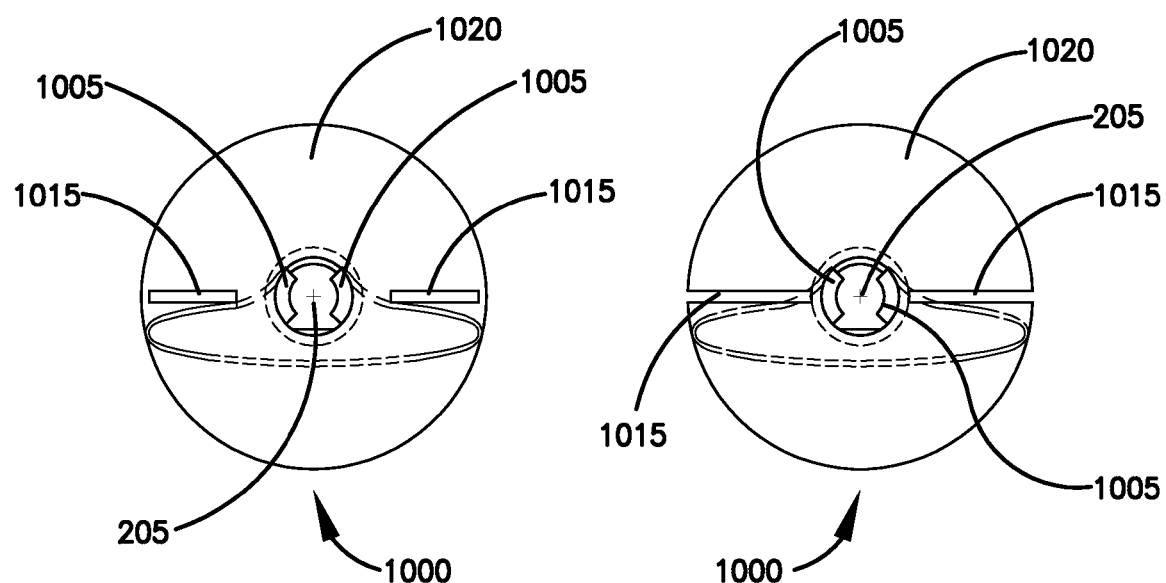
FIG. 10B    FIG. 10C

ANCHORING FASTENER WITH MOVABLE BINDING MEMBER AND METHOD FOR ANCHORING AN OBJECT

CROSS-REFERENCE TO RELATED APPLICATIONS

This application claims priority of our provisional U.S. patent application Ser. No. 60/802,045, filed May 18, 2006.

BACKGROUND

1. Field

The field is mounting and joining systems, and in particular methods and apparatus for mounting fasteners to hollow walls and ceilings and for using fasteners to join sheets of material.

2. Prior Art Fasteners

Most walls and ceilings of residential and commercial structures have a hollow cavity construction, i.e., there is a hollow space behind the wall. The wall comprises a sheet of material, typically between 1 and 2.54 cm thick, affixed to a suitable frame which includes wood or metal framing members (studs or joists). These are typically spaced on 41 or 61 cm centers. Such sheet material is sold under the trademark SHEETROCK by United States Gypsum Co., Chicago, and is known generically as drywall, wallboard, plasterboard, and gypsum board. Another less common wall and ceiling material with similar characteristics is plaster applied over a lath substrate. In the discussion below, the terms wall and ceiling are synonymous.

A variety of fasteners are commercially available for attaching, hanging, or securing objects such as pictures, mirrors, shelving, cabinetry, towel racks, handrails and other objects to a wall at a location other than over the area where a framing member is located.

Most fasteners can be divided into two general types: toggle and expansion.

Toggle Fasteners

Toggle fasteners generally comprise two components. A first or anchor component has a spreading or tilting arm or arms and is inserted with the arms folded in into a drilled hole in the wall material. A second or activating component, typically a screw or pin, activates the anchor component after the anchor component is inserted. The activating component is inserted into the anchor component, causing its arm or arms to tilt or spread within the hollow space behind the wall, thereby locking the fastener firmly in place.

Nagel, in U.S. Pat. No. 2,916,235 (1959) discloses a fastener comprising an anchor component including a pivot-mounted arm at the end of a flared tube. A hole is drilled into the wall and the anchor component is fully inserted so that the flared end rests against the outer surface of the wall, preventing further insertion. The activating component is a screw. The screw, when inserted into the tube, forces the arm to rotate until its distal end contacts the inside of the wall. Turning of the screw causes it to wedge beneath the end of the arm nearest the pivot. This completes installation of the fastener.

While Nagle's device forms a secure fastener for walls of varying thickness, it suffers from several drawbacks. The fastener cannot be installed by simply hammering or screwing it into place. A hole must first be drilled. In order to permit the screw to wedge beneath the arm, the tube must have a substantially larger diameter than the screw. In turn, this requires a larger-than-desirable hole. Further, when fully wedged against the pivot-end of the arm, the screw does not seat in a position perpendicular to the wall. Thus the screw head does not lie flush with the wall, resulting in a less-than-perfect anchoring with a high-pressure contact at the top side of the screw head, and no contact at the bottom of the screw head. Finally, Nagel's device is somewhat complex, likely requiring manual assembly of the pivot joint. The several parts very likely render Nagel's device more expensive than simpler prior-art fasteners.

Dwyer, in U.S. Pat. No. 3,213,745 (1965), Johnson, in U.S. Pat. Nos. 3,431,813 (1969) and 4,022,100 (1977), McSherry, in U.S. Pat. No. 4,181,061 (1980), Schiefer, in U.S. Pat. No. 4,289,062 (1981), and Camilleri, in U.S. Pat. No. 4,662,808 (1987), all teach fasteners which operate on the same principle. The anchor component of the fastener is inserted into a pre-drilled hole in the wall. A flared proximal portion of this component rests against the outer surface of the wall, preventing further insertion. The activating component, a screw or pin, is arranged to cause two or more arms to spread in the space behind the wall, with the arms eventually resting against the inner surface of the wall. An object is then secured to the wall by the activating component. As with Nagel, a pre-drilled hole in the wall is required. In many instances this causes the inside portion of the wall to crumble, weakening the wall at that point and limiting the weight of load supportable by the fastener.

Johnson '813 shows a rectangular fastener which is driven into a pre-drilled hole. The fasteners of the other patents use cylindrical fasteners which are inserted into a pre-drilled hole. These fasteners all displace a significant amount of drywall material. This leaves an unsightly hole upon removal of the fastener. More importantly, the size of such fasteners and the displacement of drywall material compromises the integrity of the wall.

Ellenberger, in U.S. Pat. No. 3,550,499 (1970), Moretti, in U.S. Pat. No. 5,224,805 (1993), and Remmers, in U.S. Pat. No. 6,494,653 (2002), teach fasteners with screw or pin-spread arms similar to those described above. However, the anchor component of these fasteners is hammered directly into the wall material, without requiring a pre-drilled hole. The activating component is then inserted to drive the arms apart, securing the fastener. Remmers further includes a gap in the form of a channel (FIG. 7) molded into his device. The presence of this gap can allow the tip to wobble and deflect as his fastener is hammered or screwed into a wall. Such motion can result in a larger-than desired hole, weakening the anchorage at barrel 54. The motion can also induce vibrations during insertion that cause the drywall to crumble and fail. Further, this wobbling motion and deflection can cause the anchor to enter the wall at an angle causing the front and back sides of the wall to tear or crumble, degrading the integrity of the wall material. In addition, a hammer blow could cause his fastener to bend or crumple at the gap in the fastener. In this event the fastener might not enter the wall at all. In addition, this fastener is cylindrical. When the fastener supports a load, the force is concentrated at and near the bottom of the cylinder. This places greater pressure on the wallboard beneath the fastener than if the fastener were flat and inserted horizontally into the wall. Finally, Remmers' hinges are located well away from the circumference of the activating pin and the ends of the ramps, 30 and 32 in FIGS. 3-6, are positioned so that arms 56a and 56b rotate less than 90 degrees when his fastener is installed. Because of this, arms 56a and 56B act as wedges that increase the pressure on the wallboard (FIG. 6). If the arms were able to rotate 90 degrees, their full length would bear against the inside of the wallboard, resulting in a stronger anchor.

Harker, in U.S. Pat. No. 4,902,179 (1990), teaches a drive-in anchor component structure with hinged flanges that expand circumferentially to engage the back side of the wall in response to insertion of a screw. In addition, when the screw is inserted, a longitudinally slit portion of the body expands within the hole created by the fastener. The expansion of his hinged flange adjacent the inside of wallboard 21 (FIG. 2) is limited at most to the diameter of pin or screw 60 (FIG. 2). Thus Harker's fastener forms a physical barrier of only limited extent on the backside of wallboard 21. In addition, if screw 60 is over-torqued, it will simply continue to rotate against the inner surface of the fastener, thereby reducing the fastener's effectiveness. Again, Harker's fastener is cylindrical and suffers from the same drawbacks as other cylindrical fasteners.

Gaudron, in U.S. Pat. No. 6,435,789 (2002), teaches a self-drilling fastener with a flanged, toggling anchor component. After the fastener drills its way through a wall, its flanged portion rests against the front side of the wall. The toggling portion is positioned behind the wall and pivots to a position parallel to the plane of the wall. Inserting and turning a screw draws the toggled portion toward the back side of the wall where it rests, securing the fastener.

Three holding methods are common to the above prior-art fasteners. In the first method, toggles are inserted through the wall and then urged into contact with the back side of the wall by a screw. In the second method, the anchor component comprises pre-folded arms which, after full insertion of the fastener into the wall, are forced to spread against the back side of the wall by the anchor component. In the third method, flanges engage the back side of the wall while a slit portion expands to fill the hole through which the fastener is passed.

Expansion Fasteners

The other type of fasteners, expansion fasteners, are generally secured by increasing their diameter. Some comprise an anchor component which is hammered into a wall or inserted into a pre-drilled hole. The activating component is a pin or screw which is forced into a central, cylindrical cavity within the fastener, increasing its diameter. Still others have tangs and barbs which springably expand to resist pull-out of the fastener.

Karitzky, in U.S. Pat. No. 1,452,514 (1923), and Girkin, in U.S. Pat. No. 5,221,167 (1993), teach similar fasteners which are inserted into a drilled hole. A nail or screw is inserted into the fastener, forcing its diameter to increase, thus securing it in the hole. Girkin additionally includes a lock nut which forms part of the fastener.

In U.S. Pat. No. 4,322,194 (1982), Einhorn teaches a wall fastener which is hammered or otherwise driven into a wall. After insertion, a screw forces two or more arms apart, compressing the wall around the fastener.

In U.S. Pat. No. 3,983,779 (1976), Dimas teaches a nail with tangs. The nail is driven through roofing material into decking beneath by a hammer. Tangs on the nail prevent withdrawal of the nail and securely hold the roofing material in place on the decking.

Giannuzzi, in U.S. Pat. No. 5,447,005 (1995), and Vassiliou, in U.S. Pat. No. 4,500,238 (1985), teach an initially flat fastener that is driven into the wall. A screw is then threaded into the fastener, causing it to expand, partially within the wallboard material. Although these fasteners do minimal damage to wallboard material when they are inserted, they both spread upon activation, weakening the wallboard material by crushing it.

Expansion fasteners must exert sufficient expansion force to be secure, but must not fracture or crumble their host material. These fasteners are generally inappropriate for use in friable materials, such as dry wall or gypsum board. They are limited to lighter loads as a result.

The above prior-art references all employ an anchor having a section within the wall whose axis is perpendicular to the surface of the wall. Nagel, in U.S. Pat. No. 2,916,235, teaches a screw that passes through the normal cylindrical section at an angle in order to wedge against a member at the back of his structure. In all prior-art fasteners, the activating element such as a pin, nail, or screw, enters at the geometric axis of the wall-mounted section.

The prior-art fasteners described above suffer from significant disadvantages. Many do not have the ability to accept a variety of ready-made, pre-configured pins that can be inserted without tools. Other disadvantages include the need to drill a hole in the wall, difficulty in tightening properly since over-torquing the fastener or the screw often results in crumbling of the wallboard and failure of the fastening function, and an unsightly oversized hole when the fastener is removed from such an over-torqued condition. In addition, cylindrical fasteners concentrate the load force at the bottom of the fastener. This results in local pressures that are higher than experienced with flat fasteners of comparable holding capacity. These higher pressures can cause crumbling of the wallboard material, also known as "blowout". Some of these fastening systems are also non-removable or are difficult to remove without leaving a large, unsightly hole in the wall. In addition, expansion fasteners crush the friable drywall material, limiting the grip of the device in the wall.

Prior Art Fastener—FIGS. 1A Through 1E

Other fasteners are shown in our co-pending U.S. patent application Ser. Nos. 11/171,088, filed Jun. 29, 2005 and 11/678,459, filed Feb. 23, 2007. In application Ser. No. 11/171,088, which is incorporated herein by reference, we teach a different wall anchor. A preferred embodiment of this anchor is shown in perspective in FIG. 1A. A wall-anchor section 105 of fastener 100 comprises a body with a pair of fins 110, a head portion 115, a pivotable or distal section 120, and a proximal or wall-anchor section 105. Section 120 comprises a sharpened tip 125 and a finger 130 on a projection 135. Sections 105 and 120 are tapered, with an elliptical cross-section and are joined by a living or other hinge 140. Hinge 140 can alternatively take the form of a strap, flap, lanyard, two-part hinge with a pin, or other type of connecting element.

Fastener 100 is preferably made of plastics such as those sold under the trademarks "Nylon 6" and "Nylon 66 Super Tough" by E.I. DuPont de Nemours and Company, Wilmington, Del., U.S.A.

FIG. 1B is a cross-sectional view of fastener 100. A notch 145 inside section 105 receives finger 130 on projection 135 when sections 105 and 120 are axially aligned for insertion into wallboard 101 (FIG. 1E). When sections 105 and 120 are aligned, the fastener is rigid, enabling it to be inserted. Insertion is accomplished by force from a driving device, such as a hammer, handle of a screwdriver, or manual force such as from a thumb applied to the rear or proximal face of head portion 115.

FIG. 1C show various cross-sectional shapes that may be used for wall-anchor section 105. FIG. 1C-A shows a dilatable bore 150 comprising a round or elliptical-shaped center portion 155 with a radial elliptical extension 160. Alignment fins 110 are also shown. The shape and elasticity of bore 150 permits fastener 100 to receive pin shafts (not shown here) with a wide variety of sizes and cross-sectional shapes. FIG. 1C-B shows an H-shaped bore. FIG. 1C-C shows an elliptical bore. FIGS. 1C-D and 1C-E show other bores combining elliptical and parallelepiped shapes. In all cases, bore 150 is coaxial with sections 105 and 120.

FIG. 1D shows the elliptical cross-section 111 of section 120.

FIG. 1E shows fastener 100 embedded in wallboard 101 prior to insertion of pin 141. Pin 141 comprises a rear hook 156, a shaft 144 with a tip 151, and a bump 146.

FIG. 1F shows fastener 100 fully inserted in wallboard 101, activated and ready for use. Shaft 144 of pin 141 has forced section 120 to rotate about hinge 140. Shaft 144 is firmly wedged against projection 135, forcing section 120 against the inside surface of wallboard 101. Bump 146 on shaft 144 of pin 141 is firmly lodged in notch 145.

Note, in this instance, that section 120 is oriented above section 105. When a load hangs on hook 155 of pin 140, a moment of torque exists which urges section 105 to rotate within wallboard 120. This torque is balanced in part by wallboard 101 at section 105, and partly by section 120 resting against the inner surface of wallboard 101. The distribution of forces in this orientation results in a restoring torque with an arm the length of section 105, which gives added strength to fastener 100.

While this design is superior to other prior-art designs in terms of construction and use, it still leaves an oval hole in the wall when it is removed.

ADVANTAGES

Accordingly, one advantage of one or more aspects of one embodiment is to provide an improved wall fastener and a secure anchorage system and method by which a fastener can be hammered or otherwise driven into a wall and later removed without significantly damaging the wall material. Further advantages of one or more aspects of other embodiments are to provide an easy-to-use fastener which does not require a pre-drilled hole, which is easily mass-produced, which is configured during installation as a contiguous, rigid unit without gaps, which can accept a variety of pre-configured pins that can be installed either with or without using tools, provides superior holding strength, that leaves a minimal hole in the wall, that is activated by toggling a member behind the wall rather than spreading and crushing the wallboard material, and which can be easily removed. Still further advantages of one or more aspects will become apparent from a consideration of the ensuing description and accompanying drawings.

SUMMARY

In accordance with one aspect of a preferred embodiment, a flat, initially knife-like fastener comprises a proximal wall-anchor section and a pivotable distal section or tip. The two sections are joined by an integral hinge. These sections are initially formed as a rigid unit for insertion into a wall. After the wall anchor section is seated, the pivotable section(s) is forced to pivot at the hinge by a pin or other similar element, causing the pivotable section to rest against the inside surface of the wall, thereby securing the fastener.

DRAWING FIGURES

FIGS. 1A through 1F show various views of our co-pending, prior-art fastener design.

Figure 1A:
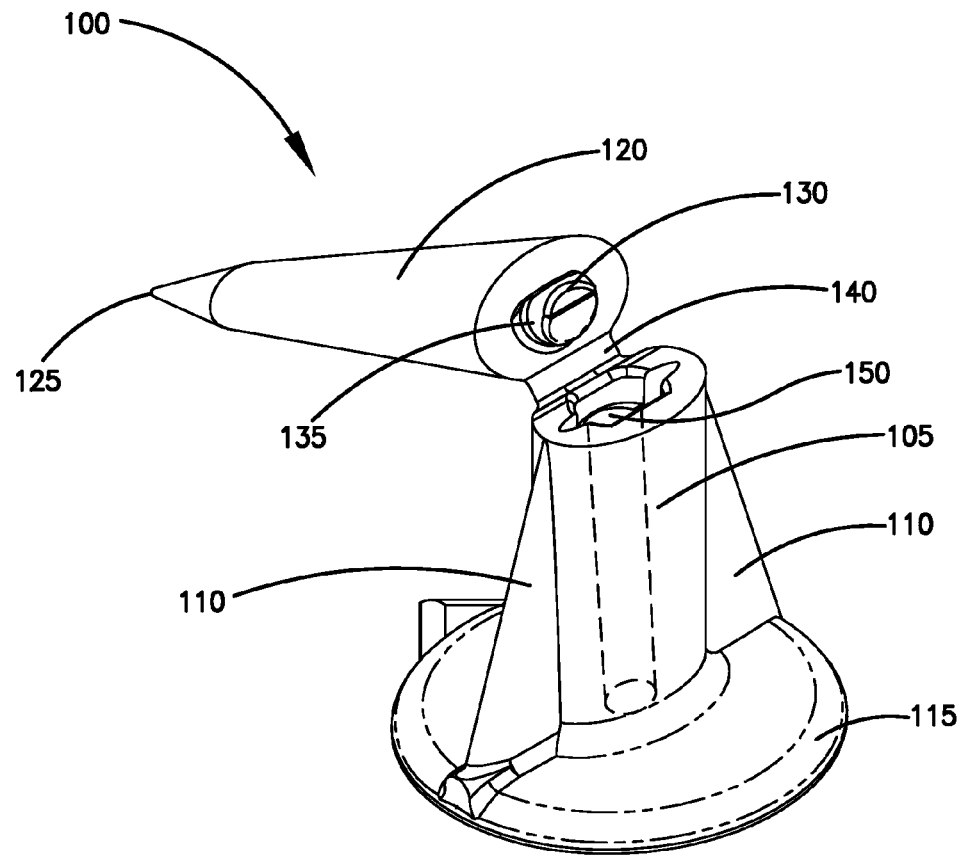

| REFERENCE NUMERALS | |
|---|---|
| 100 | Prior-art fastener |
| 101 | Wallboard |
| 105 | Wall anchor section |
| 110 | Fins |
| 111 | Section |
| 115 | Head |
| 120 | Pivotable section |
| 125 | Tip |
| 130 | Finger |
| 135 | Projection |
| 140 | Hinge |
| 141 | Pin |
| 144 | Shaft |
| 145 | Notch |
| 146 | Bump |
| 150 | Bore |
| 151 | Tip |
| 155 | Hook |
| 160 | Extension |
| 200 | Fastener |
| 202 | Annulus |
| 203 | Rib |
| 205 | Hole |
| 210 | Wedge |
| 215 | Inner surface |
| 216 | Inner edge |
| 220 | Front portion |
| 222 | Front portion |
| 225 | Hinge |
| 230 | Hinge |
| 235 | Distal end |
| 240 | Tip |
| 244 | Notch |
| 245 | Notch |
| 246 | Axis |
| 247 | Line |
| 250 | Projection |
| 251 | Surface |
| 600 | Wallboard |
| 605 | Outer surface |
| 610 | Arrow |
| 612 | Shaft |
| 615 | Pin |
| 620 | End of pin |
| 700 | Fastener |

-continued

| REFERENCE NUMERALS | |
|---|---|
| 701 | Surface |
| 702 | Hole |
| 703 | Line |
| 705 | Arm |
| 711 | Axis |
| 712 | Axis |
| 720 | Detent |
| 724 | Front section |
| 725 | Rear section |
| 730 | Tip |
| 800 | Fastener |
| 801 | Wallboard |
| 805 | Cam |
| 810 | Guide |
| 811 | Bore |
| 812 | Lines |
| 815 | Axis |
| 816 | Axis |
| 825 | Section |
| 830 | Section |
| 835 | Pin |
| 836 | Shaft |
| 905 | Axis |
| 910 | Section |
| 920 | Section |
| 930 | Guide |
| 931 | Bore |
| 940 | Front side |
| 941 | Hinge point |
| 950 | Cam |
| 960 | Fastener |
| 970 | Bore |
| 975 | Axis |
| 976 | Axis |
| 980 | Section |
| 985 | Section |
| 970 | Guide |
| 990 | Cam |
| 991 | Fastener |
| 992 | Section |
| 993 | Section |
| 994 | Bore |
| 995 | Axis |
| 998 | Detent |
| 1000 | Fastener |
| 1005 | Wings |
| 1010 | Bore |
| 1015 | Thinned section |
| 1017 | Notch |
| 1020 | Annulus |
| 1100 | Anchor |
| 1105 | Finger |
| 1110 | Projection |
| 1115 | Annulus |
| 1120 | Pin |
| 1125 | Shaft |
| 1130 | Tip |
| 1135 | Hole |
| 1136 | Axis |
| 1140 | Bore |
| 1144 | Rib |
| 1145 | Section |
| 1146 | Section |
| 1147 | Hinges |
| 1150 | Projection |
| 1200 | Fastener |
| 1205 | Projections |
| 1210 | Bore |
| 1211 | Hole |
| 1300 | Fastener |
| 1305 | Material |
| 1306 | Layer |
| 1307 | Layer |
| 1310 | Surface |
| 1315 | Surface |
| 1320 | Surface |
| 1325 | Edge |

-continued

| REFERENCE NUMERALS | |
|---|---|
| 1330 | Pin |
| 1335 | Shaft |
| 1340 | Tip |
| 1345 | Head |
| 1350 | Projection |
| 1355 | Section |
| 1360 | Tool |
| 1362 | Finger |
| 1363 | Finger |
| 1364 | Arm |
| 1365 | Arm |
| 1366 | Surface |
| 1370 | Plunger |
| 1400 | Section |
| 1404 | Section |
| 1405 | Section |
| 1406 | Back portion |
| 1407 | Crimp |
| 1410 | Finger |
| 1415 | Hinge |
| 1420 | Screw |
| 1421 | Tip |
| 1500 | Finger |
| 1505 | Pin |
| 1510 | Channel |
| 1515 | Screw |

FIRST EMBODIMENT

Description—FIGS. 2A-2F, and 3-5

FIGS. 2A through 2E respectively show top, bottom, left, right, rear, and front views of a first embodiment of a fastener 200 in its initial configuration.

Figure 2A:
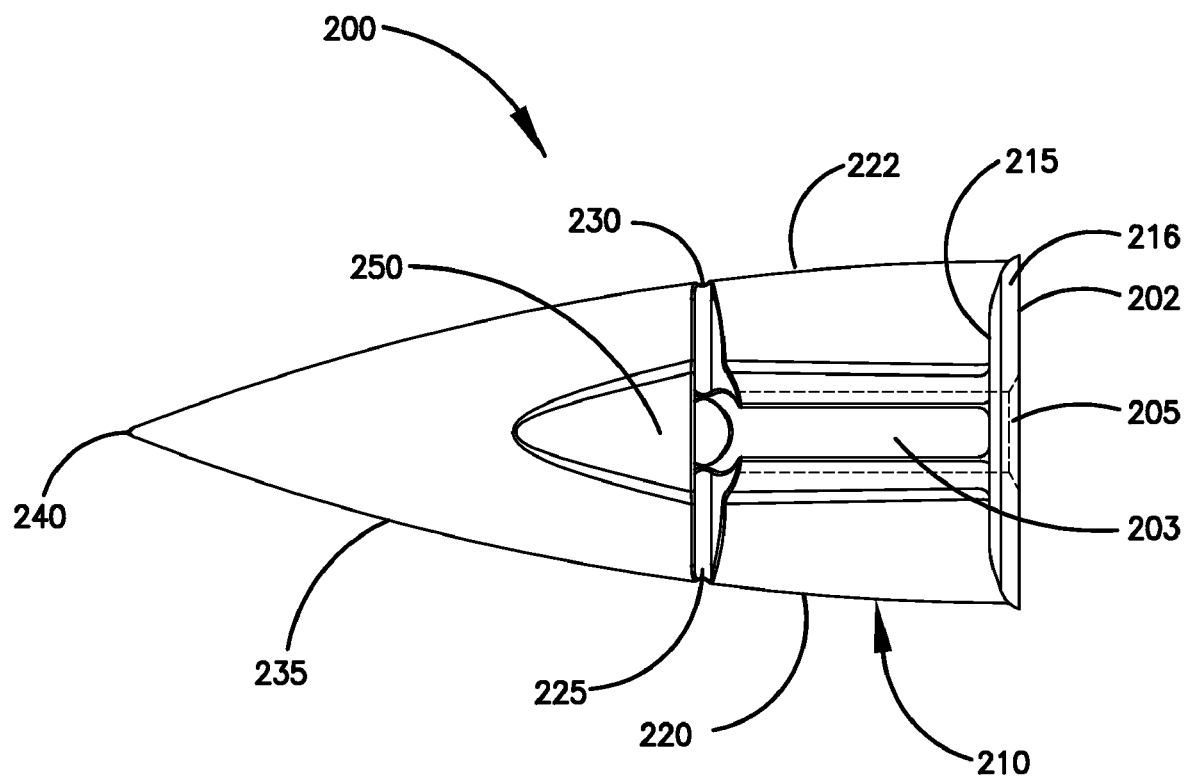
FIGS. 2A through 2F show top, bottom, left, right, rear, and front views of a first embodiment.
Figure 2B:
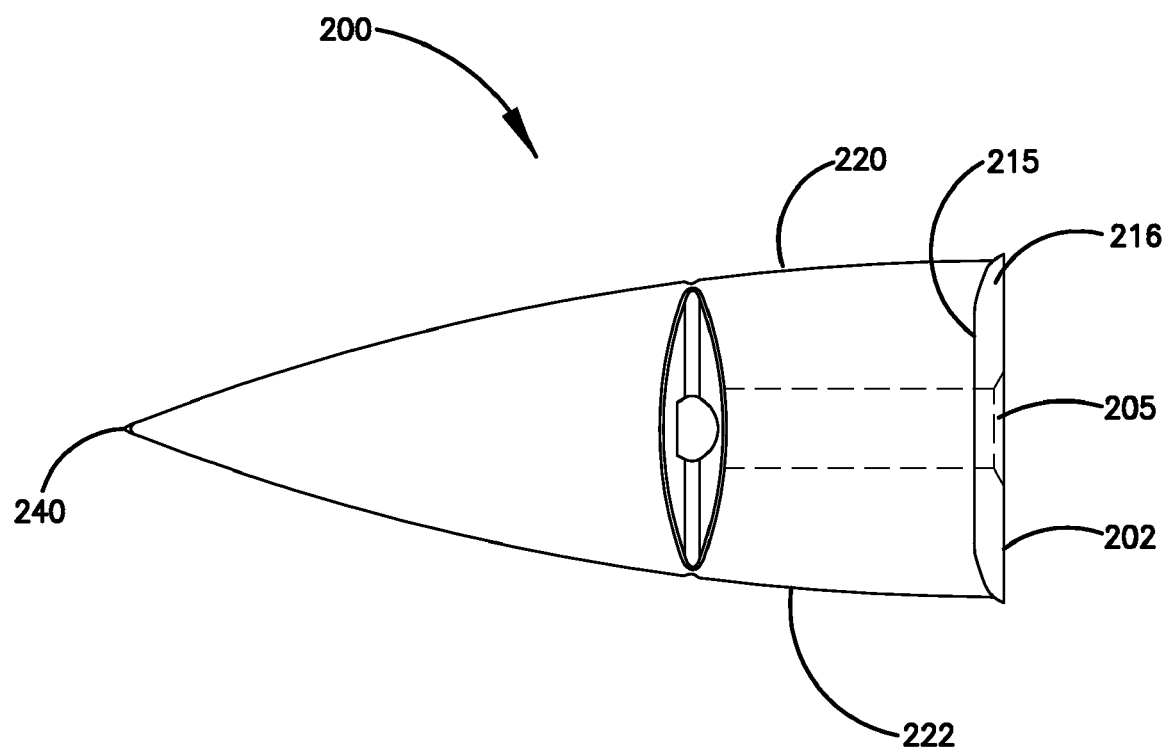
Figure 3:
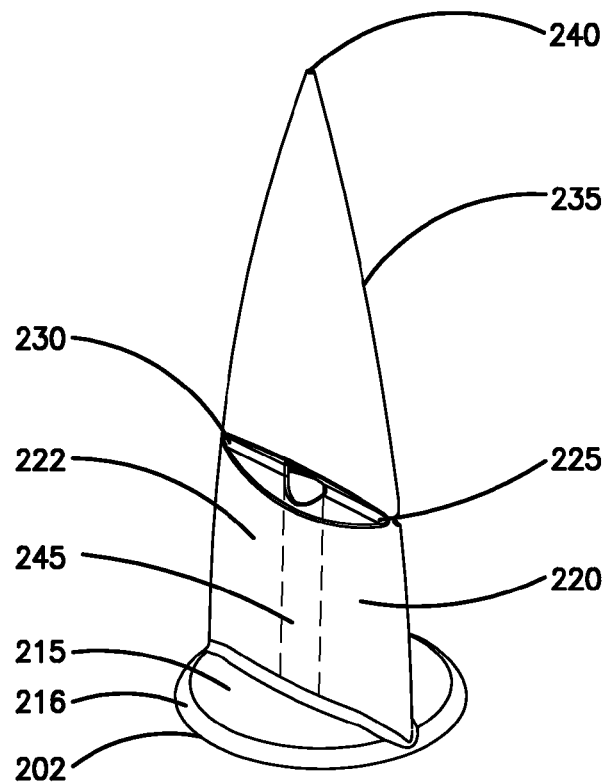
FIG. 3 is a perspective view of the bottom of the embodiment of FIG. 2.
Figure 4:
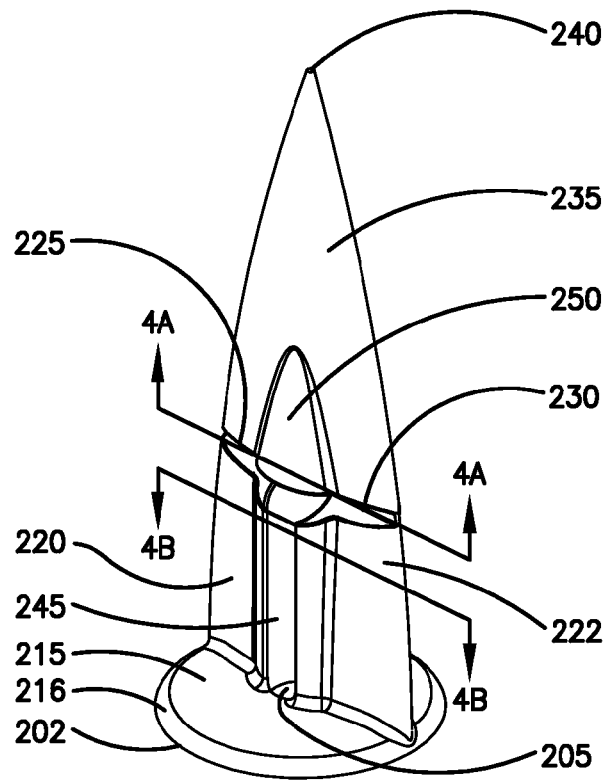
FIG. 4 is a perspective view of the top of the embodiment of FIG. 2.
Figure 4A:
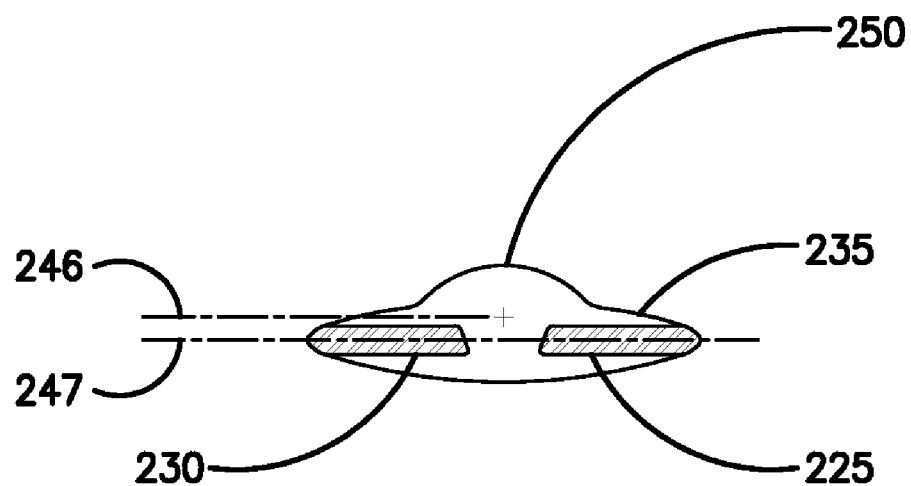
FIGS. 4A and 4B are sectional views of FIG. 4.
Figure 4B:
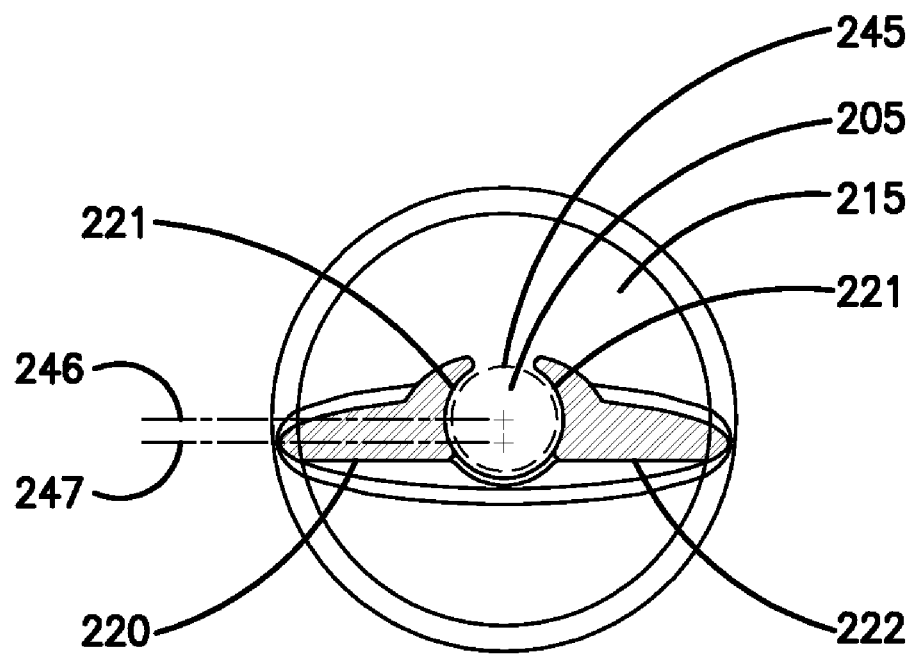
Figure 5:
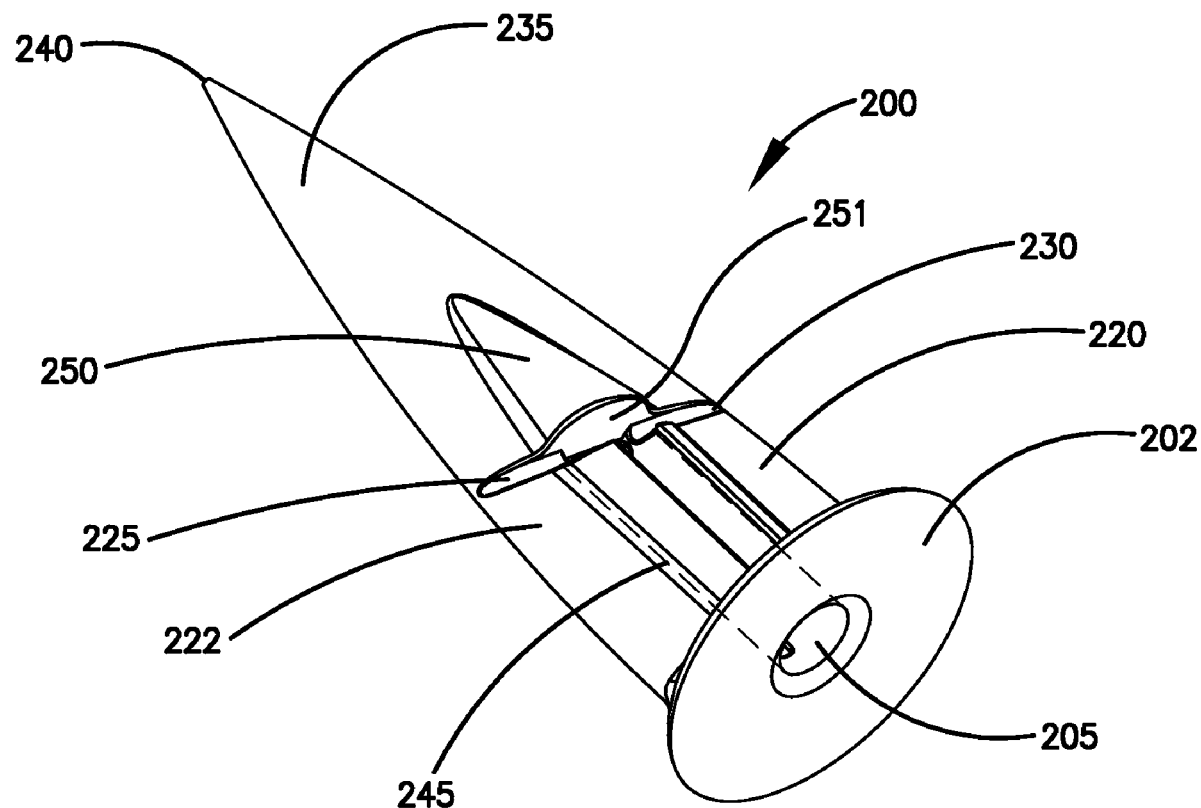
FIG. 5 is a perspective view showing the front side of the embodiment of FIG. 2.

FIG. 3 is a perspective view of the bottom side of the anchor of FIG. 2B. FIG. 4 is a perspective view of the top side of the anchor of FIG. 2A. FIG. 5 is a perspective view of the rear side of this embodiment.

In FIGS. 2A through 5, a proximal portion comprises a circular annulus 202 with a central hole or bore 205 and inner edge 216. A thin, knife-like, nearly-flat wedge 210 rigidly extends from the inner surface 215 of annulus 202 at the rear or proximal end to a tip 240 at the front or distal end. Although the rear portion of the fastener is a circular annulus in this particular embodiment, it can just as well have a square, oval, hexagonal, triangular, or other shape.

Wedge 210 comprises two portions 220 and 222 adjacent surface 215 and will be called proximal portions since they are closer to annulus 202, which is hammered or pushed in by the user. Portions 220 and 222 each have one end terminating at surface 215 of annulus 202. The other ends of portions 220 and 222 terminate at a pair of hinges 225 and 230, respectively. Hinges 225 and 230 are formed within a pair of oppositely-facing notches 244 and 245 (FIG. 2D) forming a thinned section between portions 220 and 222. A distal portion 235 of wedge 210 extends forward from hinges 225 and 230. The distal end of portion 235 terminates in sharpened tip 240.

In the pre-activation condition shown in FIGS. 2A through 2F, and 3 through 5, portions 220, 222, and 235 all lie in the same plane. The thinned sections comprising hinges 225 and 230 are initially rigid and maintain the coplanar positions of portions 220, 222, and 235 until fastener 200 is activated, as described below.

Hole 205 passes through annulus 202 and rib 203 (FIGS. 2A-2E). In this aspect, the axis of hole 205 lies above the plane of sections 220 and 235. Alternatively, the axis of hole 205 can lie within or below the plane of sections 220 and 235. A second axial line 247 lies within the plane containing sections 220 and 235.

A cam-follower projection 250 (FIGS. 2A, 2C, 4 and 4A) with a proximal surface 251 (FIGS. 2C, 2D, and 5) is formed at the center of the second side of portion 235. Projection 250 is preferably an axial-cut conic section. The end of projection 250 nearest hole 205 rises approximately 2.5 mm above the plane containing section 235. Prior to activation (described below) of fastener 200, a line drawn through the center of hole 205 intersects projection 250 approximately 1 mm above mid-height. Axis 246 lies approximately 1 mm above the plane containing line 247. Thus, prior to activation of fastener 200, when a screw or pin is inserted into hole 205, the axis of the screw or pin intersects surface 251 of projection 250 at a point offset above the plane of portions 220, 222, and 235.

In one embodiment the outer diameter of annulus 202 (FIGS. 2A, 3, 4, and 5) is preferably 1.25 cm and the diameter of hole 205 is preferably 3 mm, or the diameter of a U.S. Unified Standard #8 screw. Portions 220 and 222 preferably extend to the left (FIG. 2A) from surface 215 a distance of 1.25 cm, approximately equal to the thickness of the wallboard (not shown here) into which fastener 200 is to be installed. Section 235 is preferably 1.5 cm in length from the line containing hinges 225 and 235 to tip 240. Wedge section 210 is preferably 2 mm thick starting at surface 215 and smoothly tapers down to a thickness of 1 mm just prior to reaching tip 240, where it becomes a point.

Fastener 200 is preferably formed from a metal such as steel, but many other materials are suitable, including nylon and other plastics, metals, and hardwood.

Operation—FIGS. 6A-6E

Figure 6A:
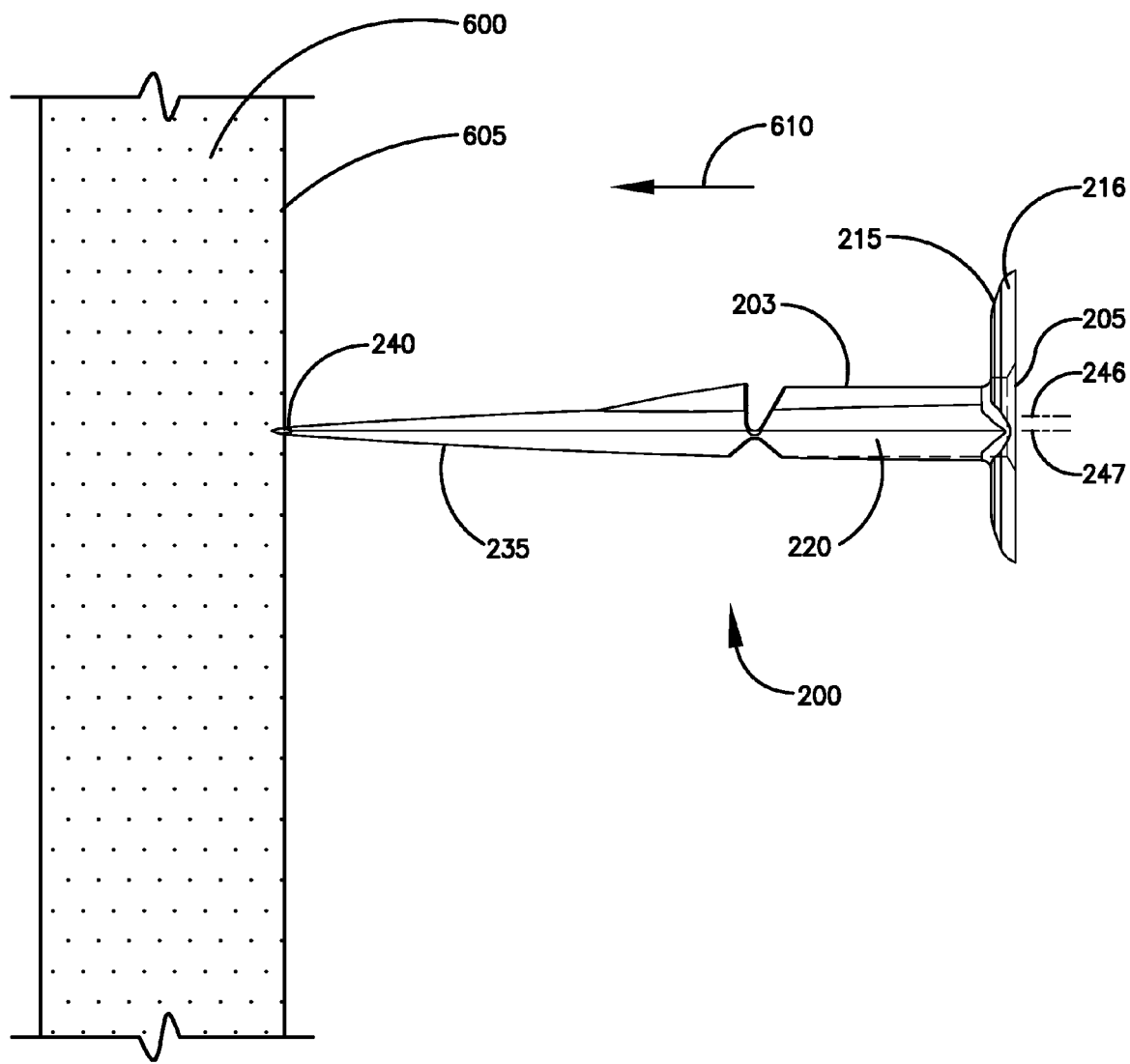
FIGS. 6A through 6E show installation of the first embodiment.
Figure 6B:
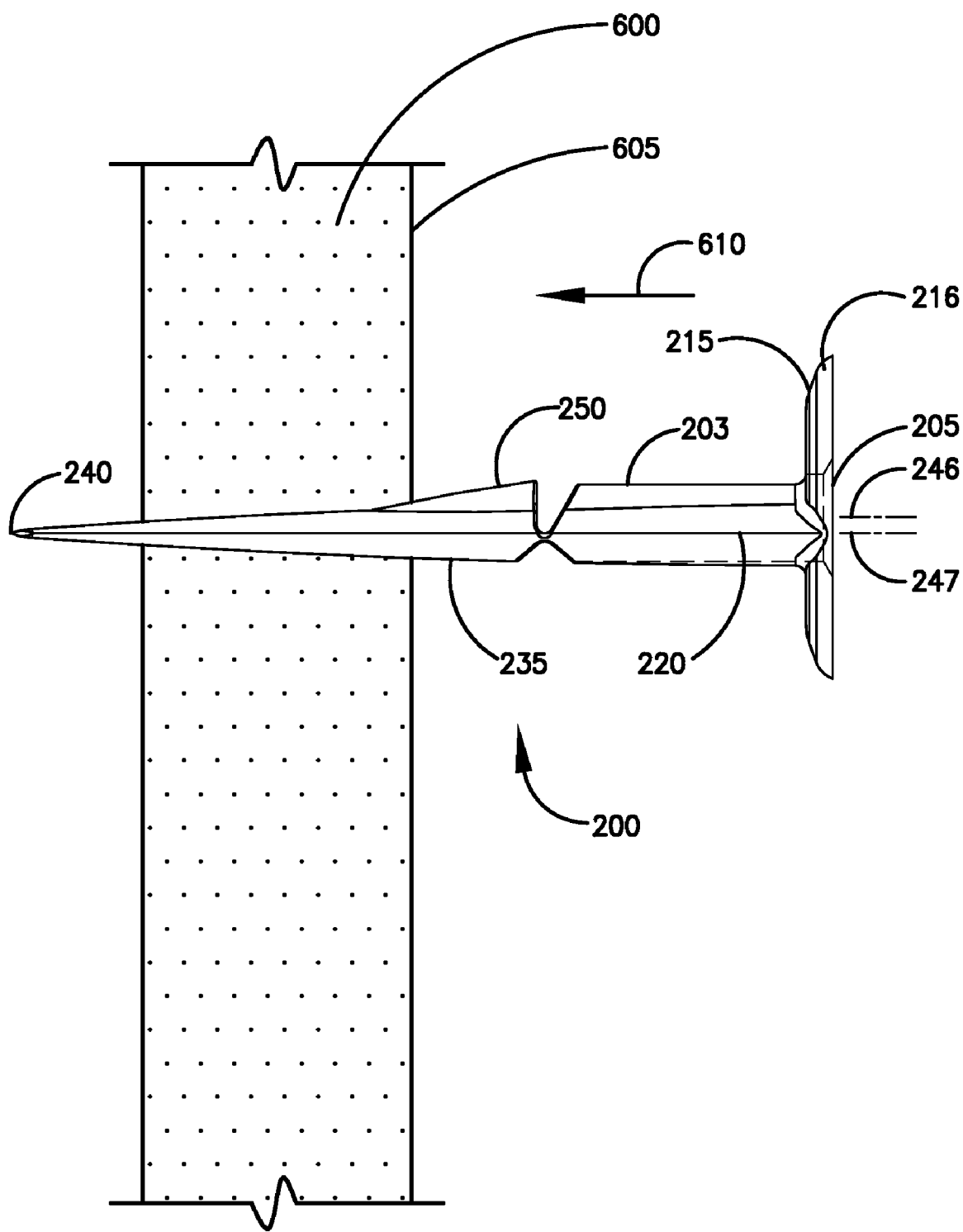
Figure 6C:
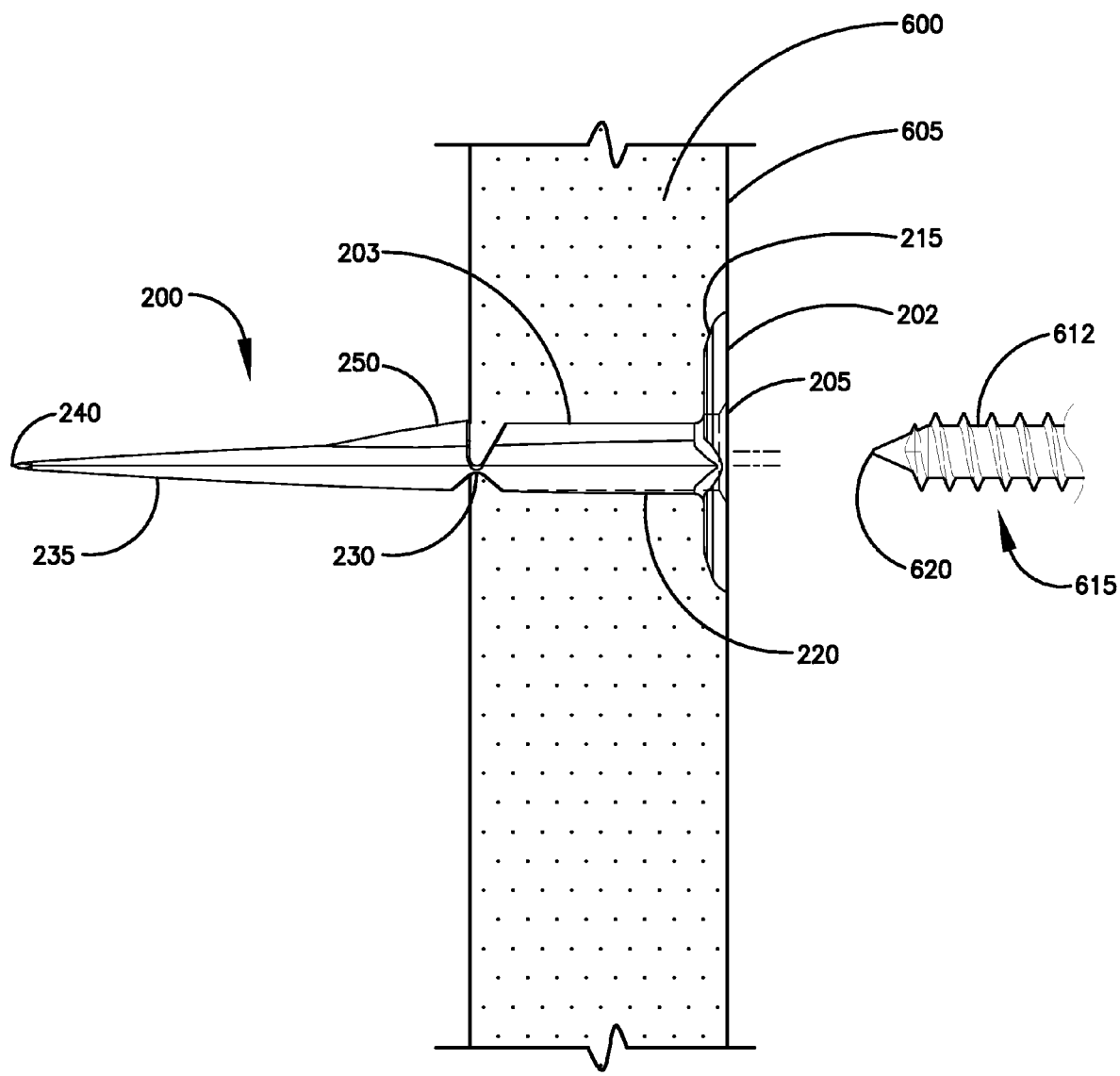
Figure 6D:
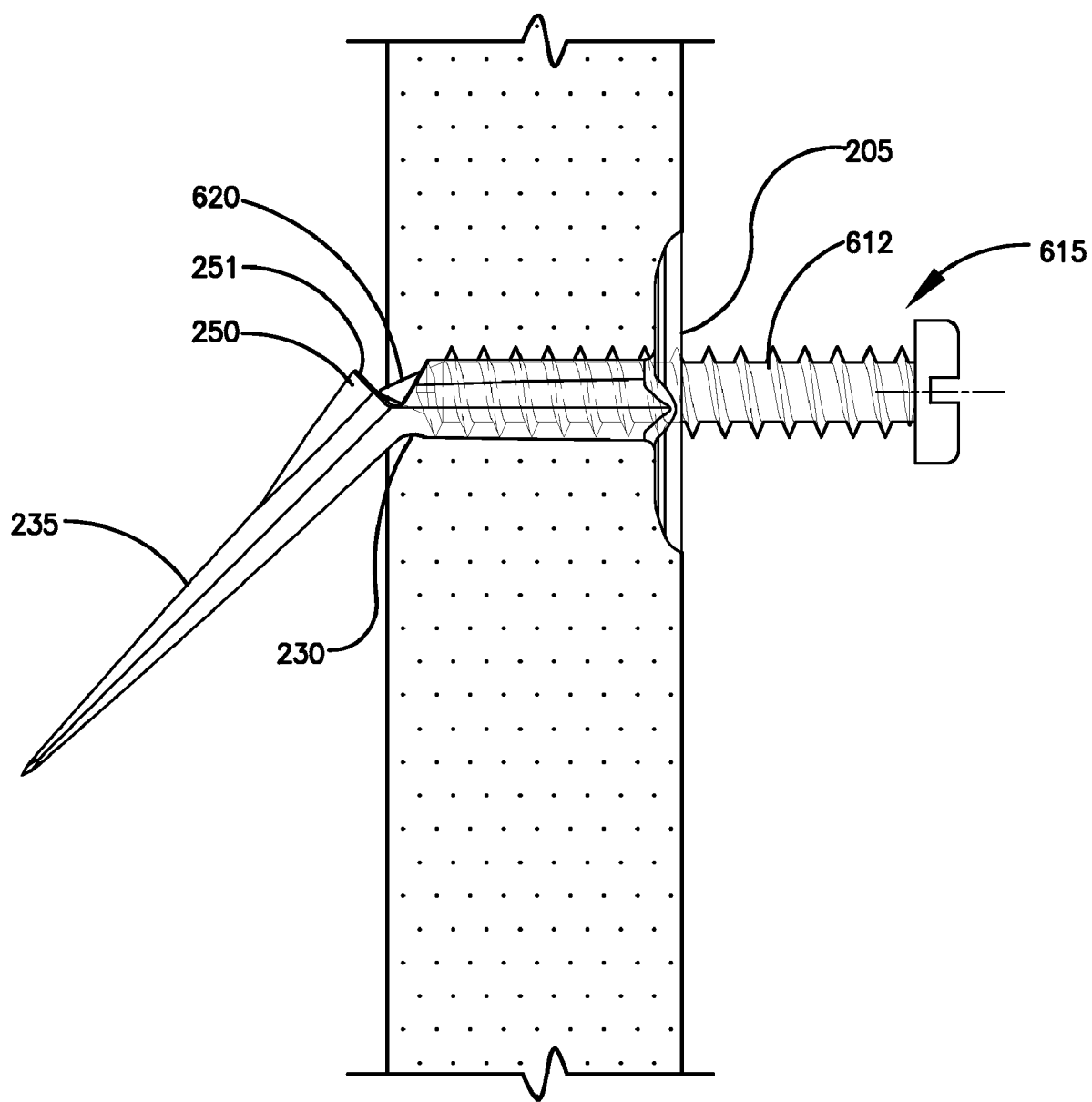

Tip 240 (FIG. 6A) of fastener 200 is placed in contact with the outer surface 605 of wallboard 600. Fastener 200 is then forcibly urged in direction 610 by thumb pressure, a hammer blow, or other method, thereby penetrating wallboard 600 (FIG. 6B). When fastener 200 is fully inserted (FIG. 6C), inner surface 215 of annulus 202 rests firmly against or indents outer surface 605 of wallboard 600. Hinges 225 (FIG. 2A) and 230 (FIG. 2D) now lie in or near the plane containing the inner surface of wallboard 600. Thus sections 220 and 222 (FIGS. 2C and 2D) lie within wallboard 600, and section 235 extends into the space behind wallboard 600. Hinges 225 and 230 are sufficiently rigid to remain unbent during insertion into wallboard 600. Hinges 225 and 230 can be either a hinge with a pin, a living hinge such as a plastic piece, or a bendable metal strap that deforms as section 235 bends downward upon being urged by a screw 615 or other object (FIG. 6D).

Next, an activating pin or screw 615 (FIG. 6C) is inserted into hole 205 of fastener 200. Pin 615 can be any of the types taught in our above-mentioned, co-pending application. These include hooks with threaded shafts, hooks with ratcheted shafts, hooks with bumped shafts, screws, straight-sided pins, and the like. Shaft 612 of pin 615 is shown threaded in this embodiment and is of sufficient length to activate fastener 200. The outer diameter of shaft 612 (i.e., including the height of the threads on shaft 612) is approximately equal to that of hole 205.

Figure 13A:
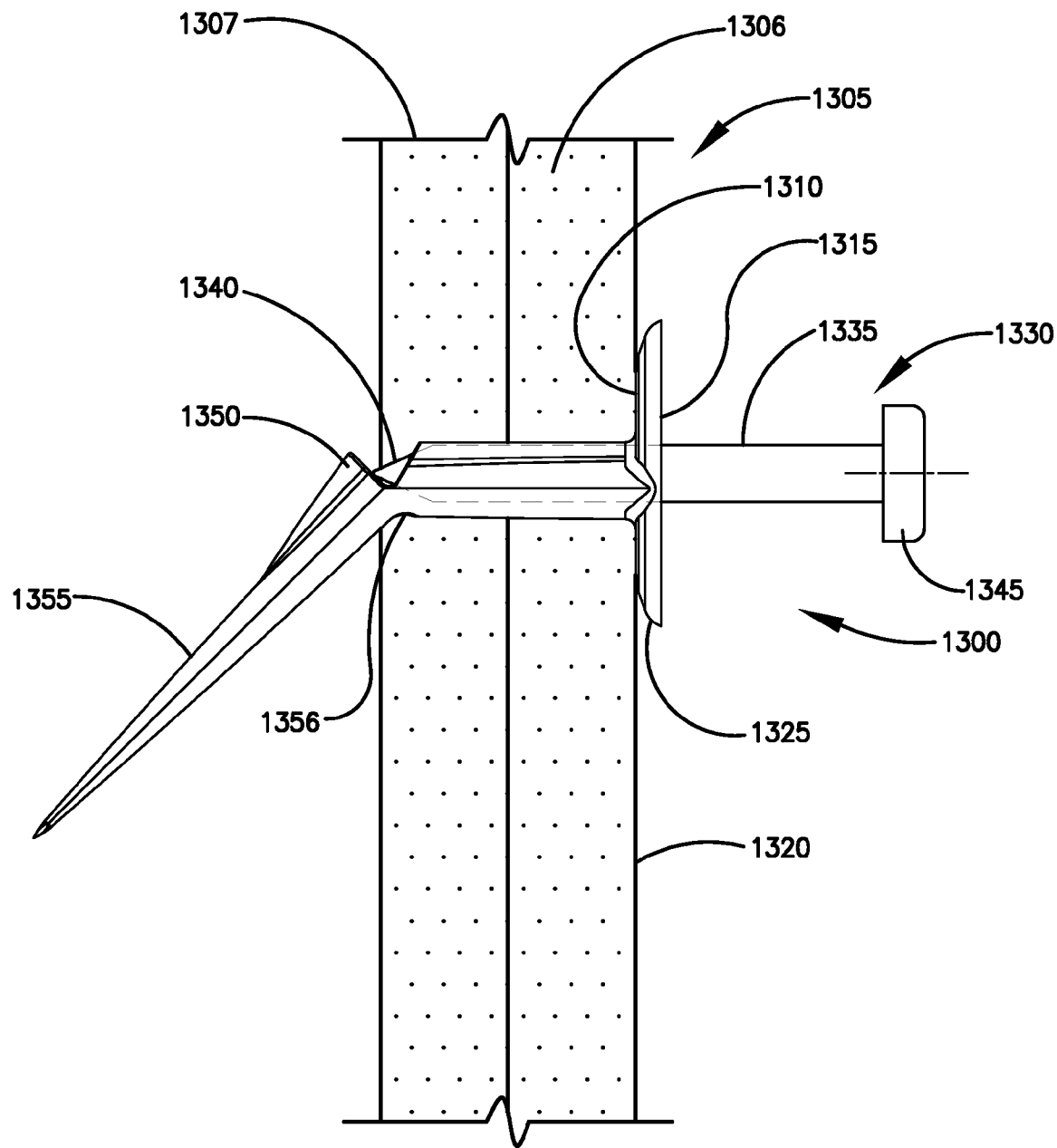
FIGS. 13A and 13B illustrate installation of any of the above embodiments using a tool.
Figure 13B:
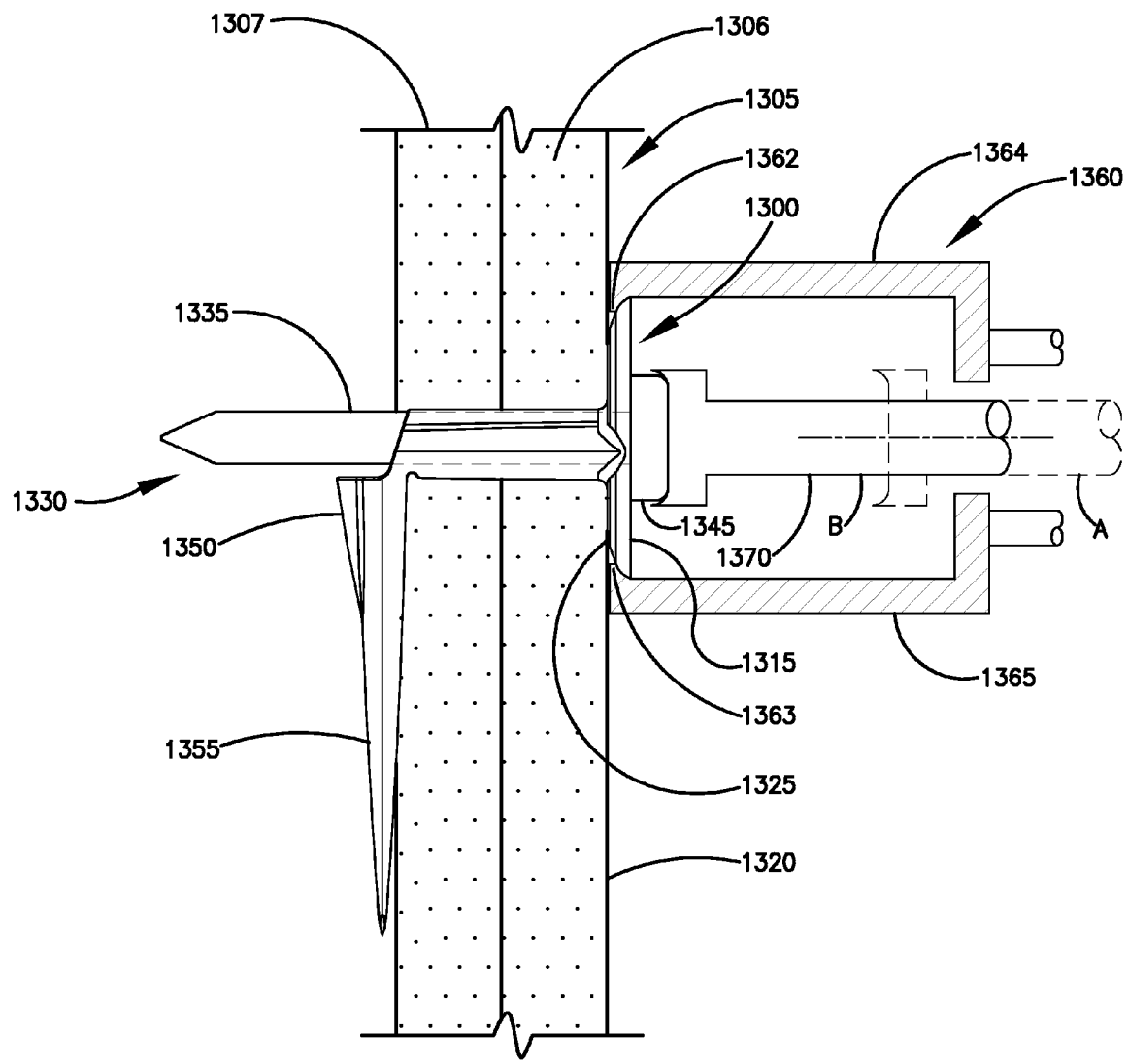

If pin 615 includes screw threads, it is preferably inserted either manually or by using a screwdriver or other implement to turn it about its axis. If pin 615 has ratchet teeth or smooth sides (not shown), it is preferably inserted manually or by axially-applied force from a tool such as a hammer or any tool capable of applying axial force, including tool 1360 (FIGS. 13A and 13B).

As pin 615 is inserted into fastener 200 through hole 205 (FIG. 6D), its distal end or tip 620 contacts the proximate side surface 251 of cam follower projection 250 at a point above the plane containing section 235. In this embodiment, the tip of pin 615 must contact surface 251 at a point above the plane containing section 235 in order to activate fastener 200. If the axis of pin 615 were to lie below the plane containing section 235, fastener 200 would not be activated. If the axis of pin 615 were to lie within the plane containing section 235, fastener 200 would not activate and if sufficient force were applied, hinges 225 (FIG. 2C) and 230 (FIG. 2D) could be broken, thereby destroying fastener 200.

Figure 6E:
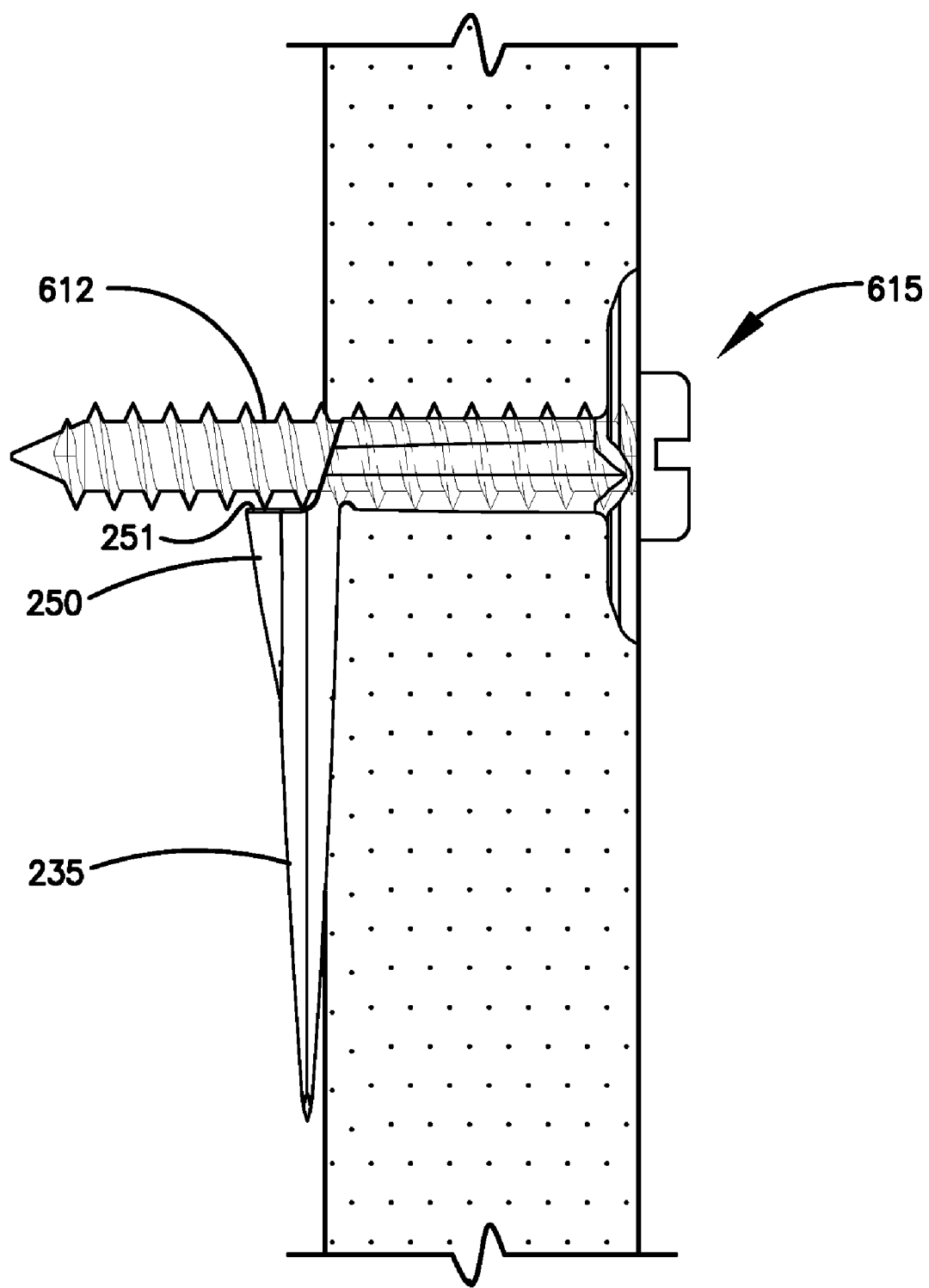

Upon further urging of pin 615, the rigidity of hinges 225 and 230 is overcome. The material comprising fastener 200 is selected to be flexible in the thinned sections at hinges 225 and 230. Therefore, pin 615 forces projection 250, and therefore section 235, to rotate downward about an axis containing both of hinges 225 and 230 (FIG. 6D). Thus all of section 235 is rotated through an angle of approximately 90 degrees, thereby securing fastener 200 in wallboard 600. Section 235 is prevented from rotating back toward its original position by the outer surface of pin 615 which contacts projection 250 (FIG. 6E).

If shaft 612 has smooth, straight sides (not shown), it is inserted by the application of axial force and will be held in fastener 200 by sliding friction against the inner walls of hole 205, and the upper surface of projection 250. In some uses, this amount of restraining force may be adequate. For a stronger hold, shaft 612 has threads as shown or ratchet teeth (not shown) that lightly penetrate the inner surfaces of hole 205. For a yet-stronger hold, shaft 612 has circumferentially partial threads or ratchet teeth with a still larger diameter. Upon partial rotation these teeth or threads firmly engage the mating partial threads in the walls of hole 205, and may even somewhat deformingly enlarge hole 205 and sections 220 and 222 (FIG. 3) of fastener 200.

After fastener 200 is installed and activated by pin 615, objects can be hung from pin 615. Alternatively, pin 615 can be used to hold objects in place on a wall or ceiling or other surface. As described below, fastener 200 can alternatively be used to hold two or more layers of material together.

Removal of fastener 200 from wallboard 600 is accomplished by reversing the above steps. Pin 615 is first withdrawn from hole 205. If pin 615 is threaded, a screwdriver can be used. If pin 615 has another holding mechanism, fingers, pliers, or other gripping means can be used to pull the pin out. Then annulus 202 is pulled away, using pliers or another gripping tool, from surface 605 of wallboard 600. Sections 220, 222, and 235 follow. The removal force causes section 235 to rotate clockwise about the axes of hinges 225 and 230 until it lies in the plane of sections 220 and 222. At this point, sections 220, 222, and 235 all slide freely out of the hole in wallboard 600 and fastener 200 is removed.

SECOND EMBODIMENT

Figure 7A:
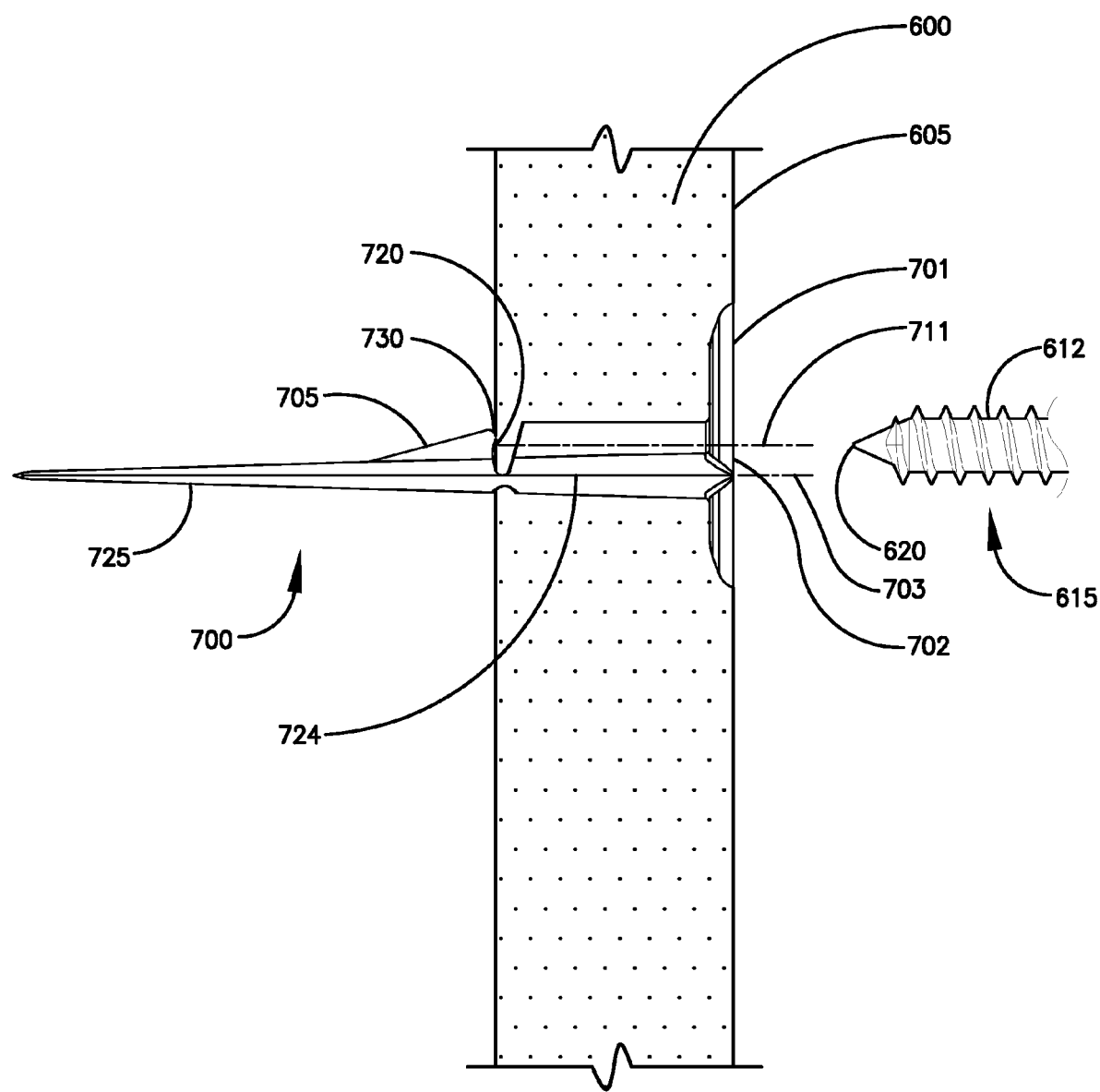
FIGS. 7A through 7C show installation of a second embodiment.
Figure 7B:
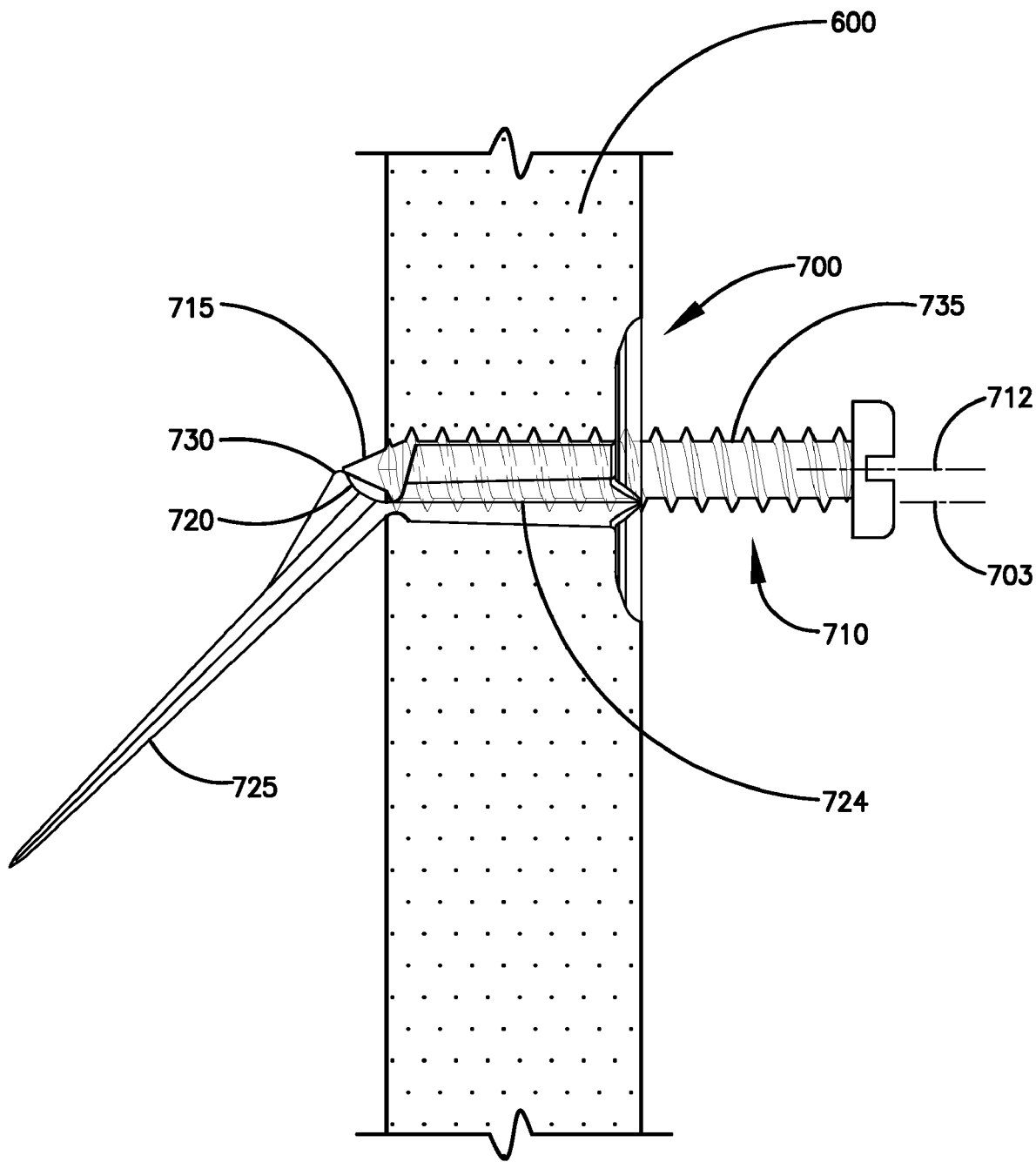
Figure 7C:
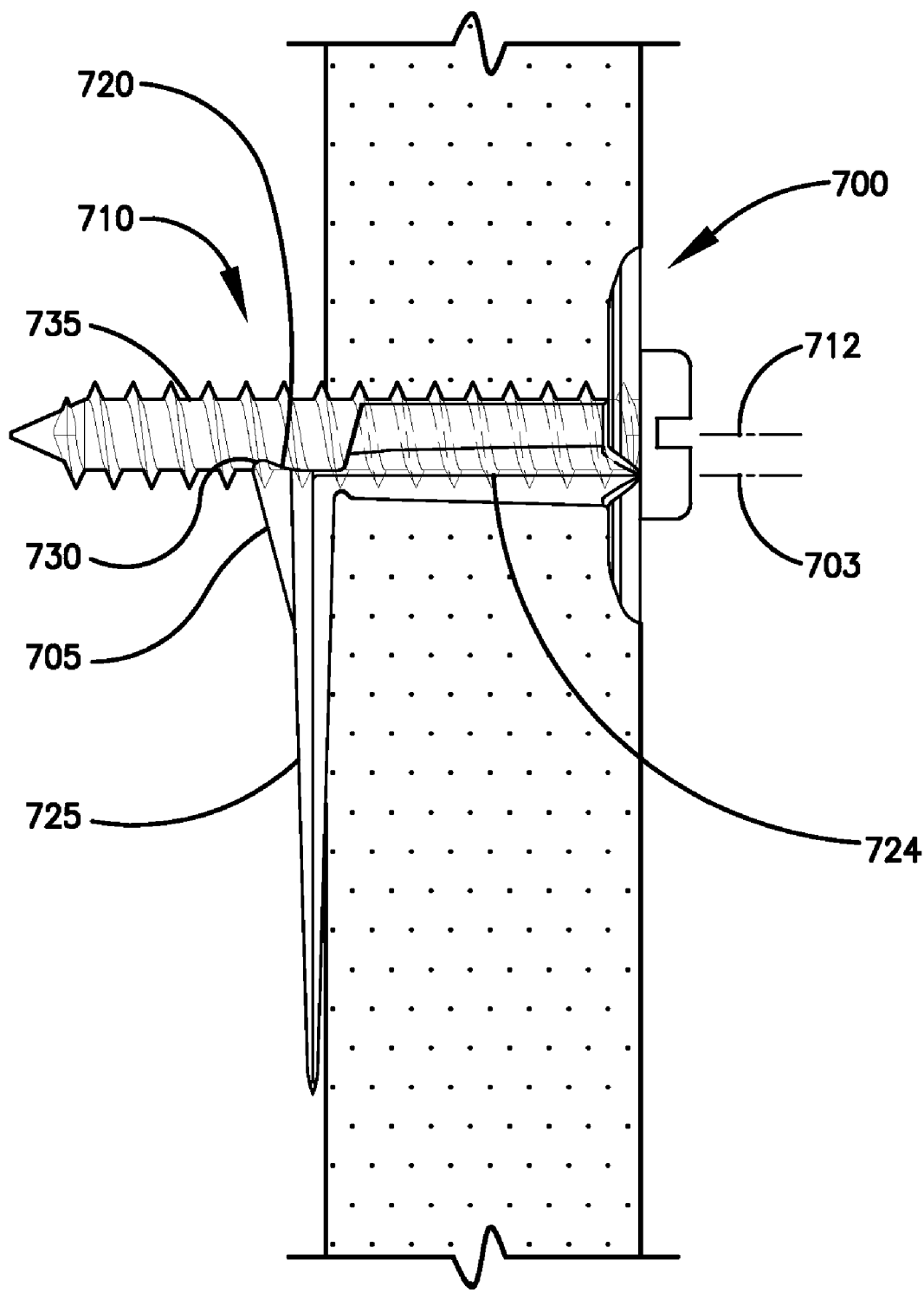

Description and Operation—FIGS. 7A-7C

A second embodiment includes a modification of projection 250 (FIGS. 2A, 2C, 2D, and 4). Fastener 700 (FIG. 7A) is similar to fastener 200, except that projection 250 (FIG. 2C) is replaced with an extended cam-shaped lever arm 705 (FIG. 7A). Arm 705 includes a detent or concavity 720 that provides a cam-follower surface and a tip 730.

Prior to activation of fastener 700, front and rear sections 724 and 725 lie in the same plane, indicated by line 703. A hole 702 has an axis 711 and receives a pin 615. Hole 702 lies above the plane containing sections 724 and 725 and line 703.

In use, fastener 700 is inserted into wallboard 600 until outer surface 701 is flush with the outer surface 605 of wallboard 600 (FIG. 7A).

Fastener 700 is activated by pin 615. Pin 615 is inserted with its axis 712 collinear with axis 711 so that it lies above the plane of sections 724 and 725. As pin 615 is inserted into fastener 700, the tip 620 of pin 615 first engages detent 720 of arm 705. Since the axis of hole 702 in the front or proximal section 724 is above or offset from the axis of rear or distal section 725, tip 620 of pin 615 will engage cam-follower surface 720 at a location farther from the hinge or pivot between the distal and proximal sections.

As pin 615 moves farther into fastener 700, rear section 725 of the fastener rotates downward until it is in contact with the inner surface of wallboard 600. Tip 730 of arm 705 still lies in the path of tip 620 of pin 615 (FIG. 7B). As pin 615 is forcibly moved farther into fastener 700, pin 615 presses against tip 730 until tip 620 of pin 615 moves past tip 730. At this point, shaft 612 of pin 615 rests firmly against tip 730 of fastener 700 (FIG. 7C). Cam-shaped lever arm 705 creates an increased vise-like effect on the portion of wallboard 600 lying between annulus 701 and arm 725.

This configuration is useful when the rotation of section 725 must be greater than 90 degrees. This can happen when front section 724 extends beyond the inner surface of wallboard 600, for example.

Removal of fastener 700 is accomplished in the same manner as described above in the case of fastener 200 of FIG. 6.

THIRD EMBODIMENT

Figure 8A:
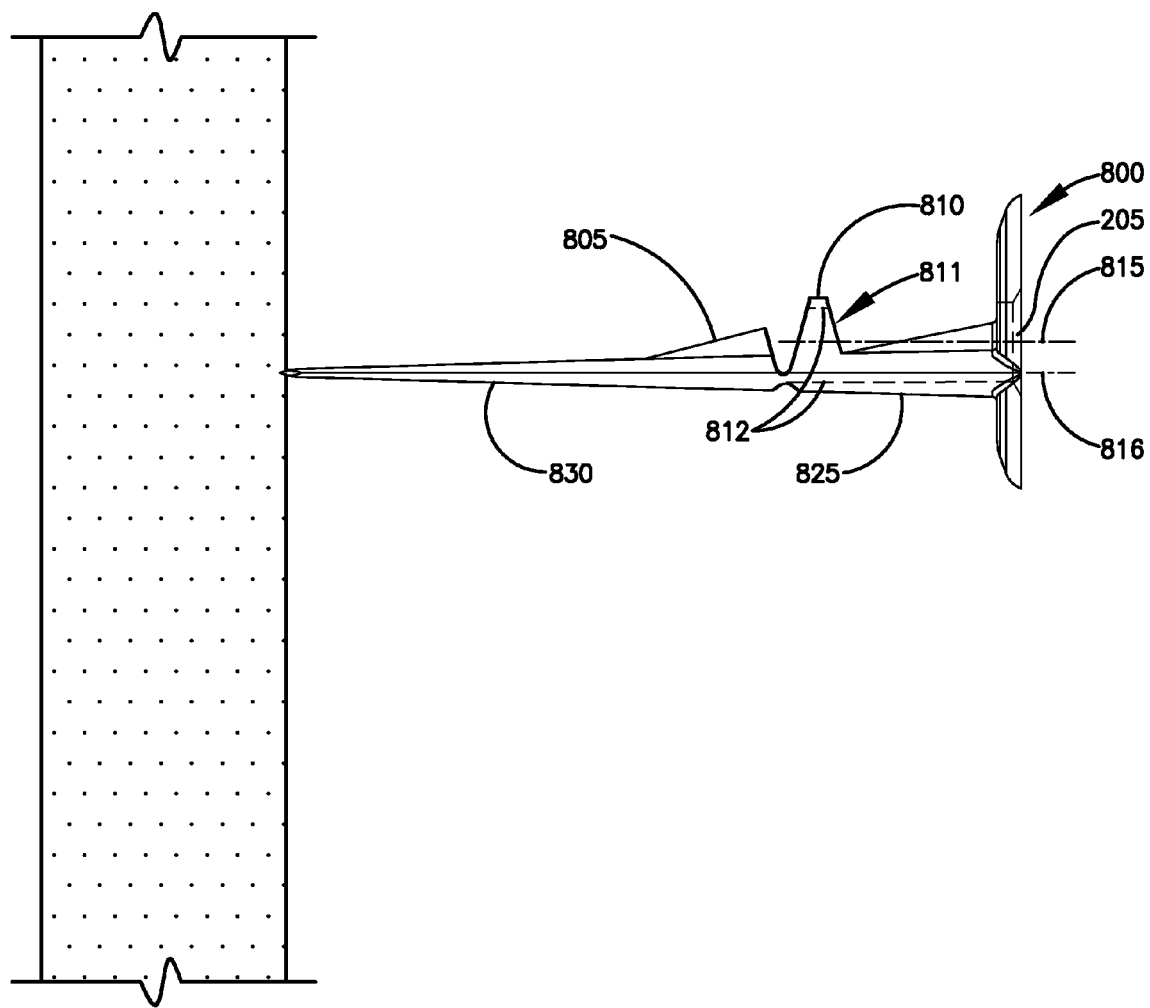
FIGS. 8A through 8C show a third embodiment.
Figure 8B:
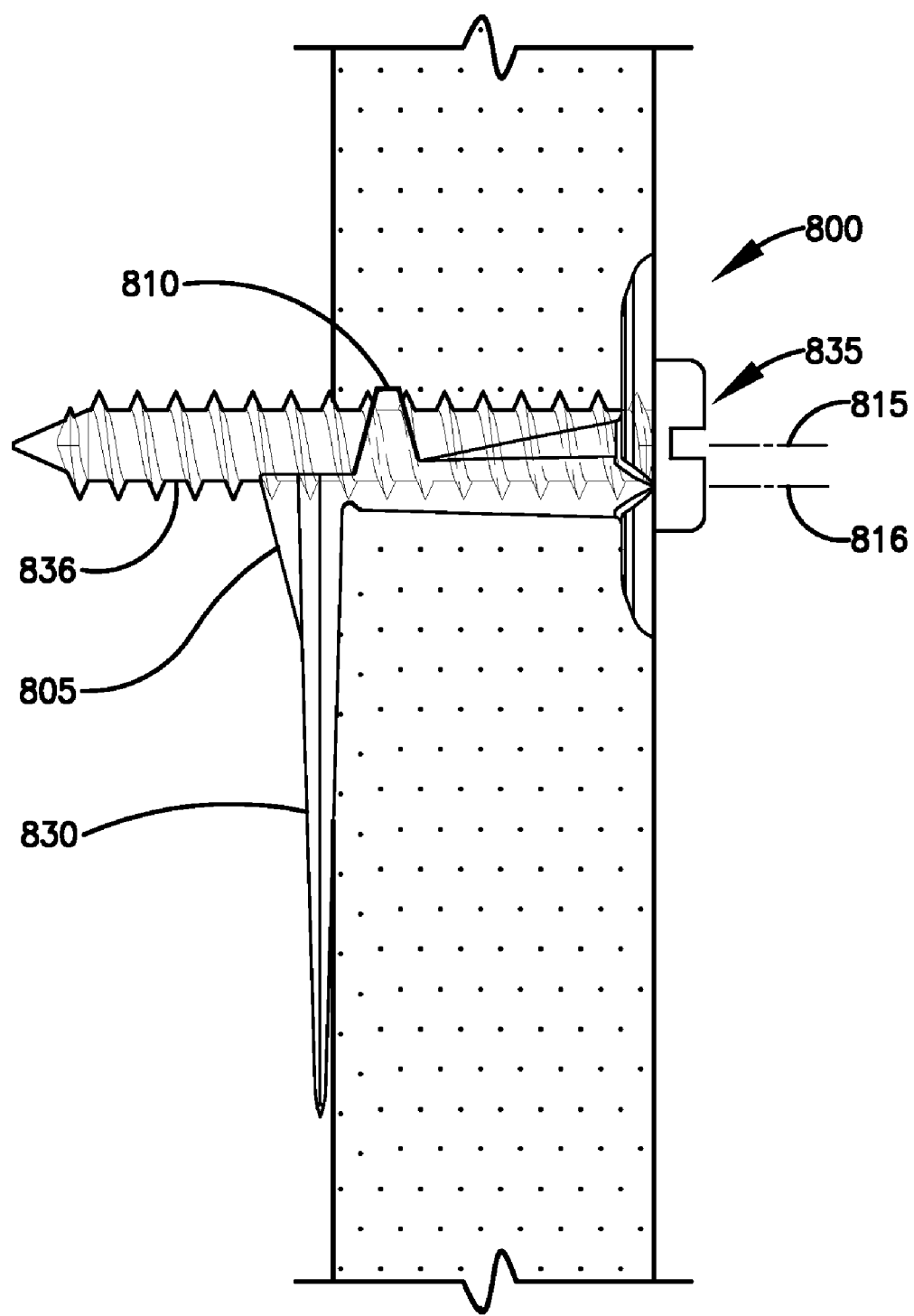
Figure 8C:
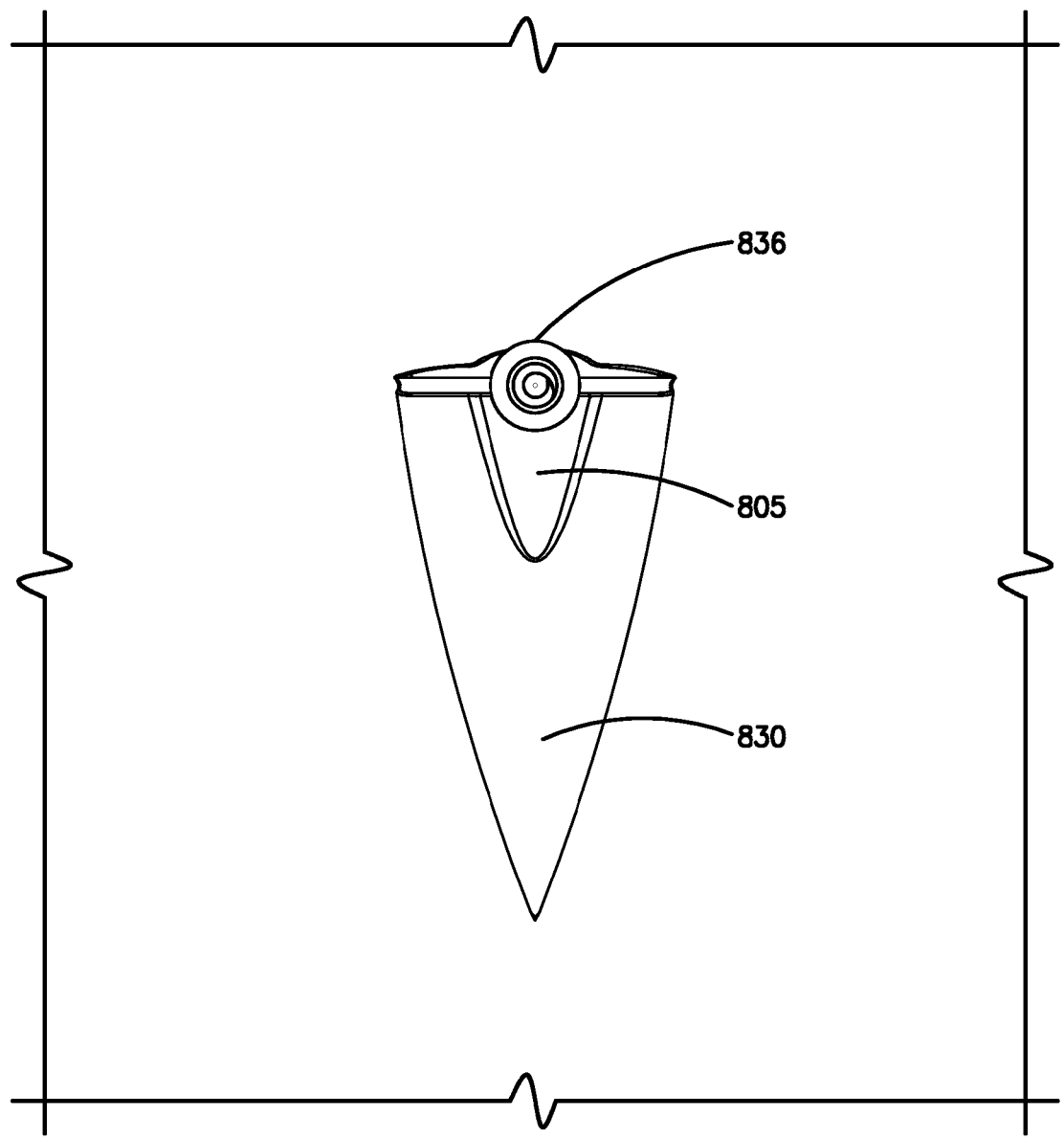

Description and Operation—FIGS. 8A Through 8C

Figure 2C:
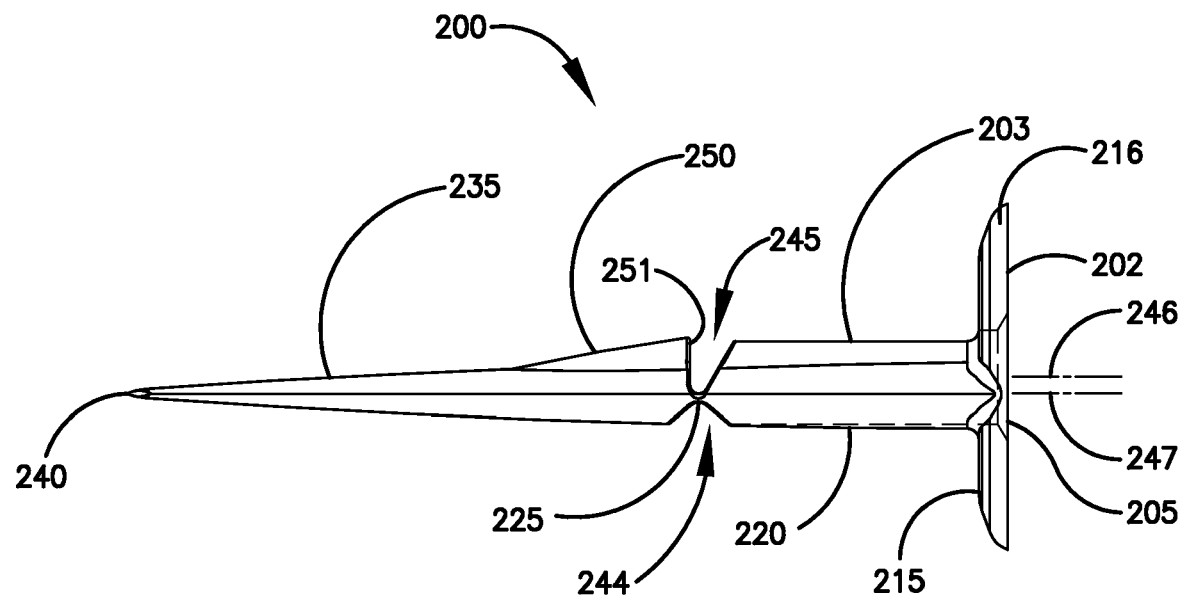
Figure 2D:
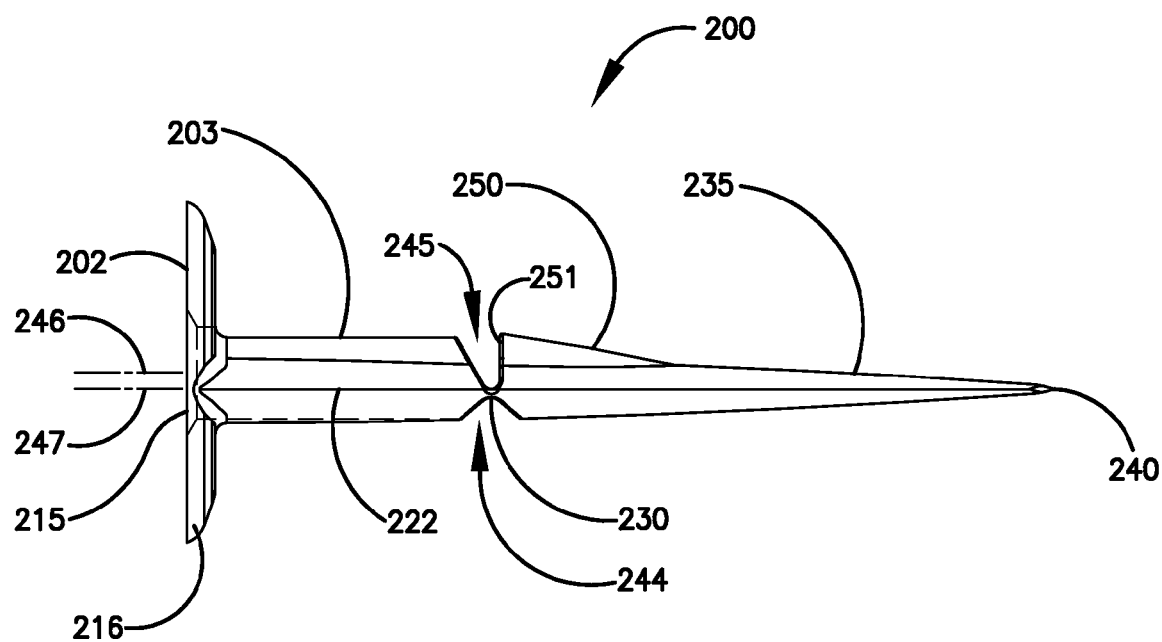
Figure 2E:
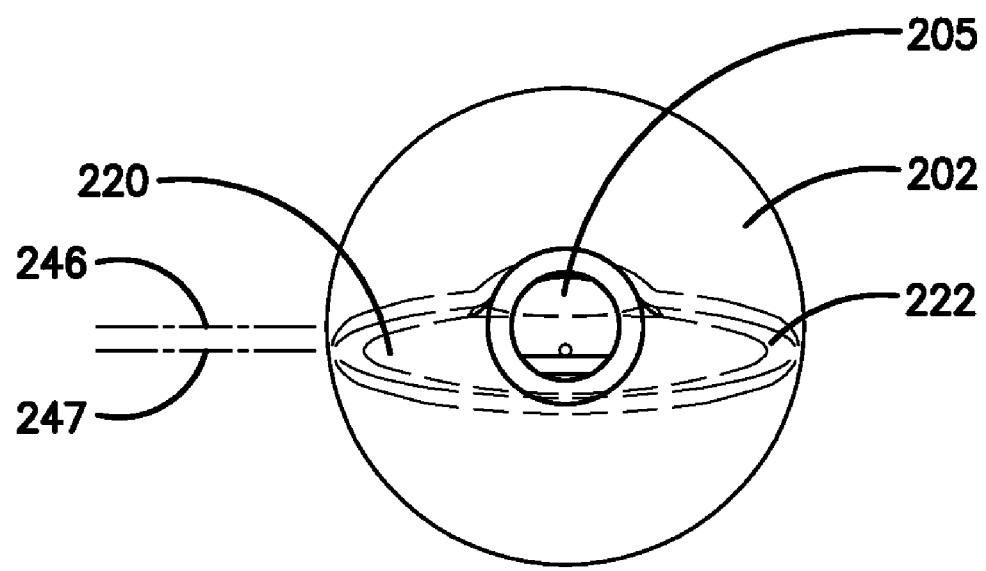
Figure 2F:
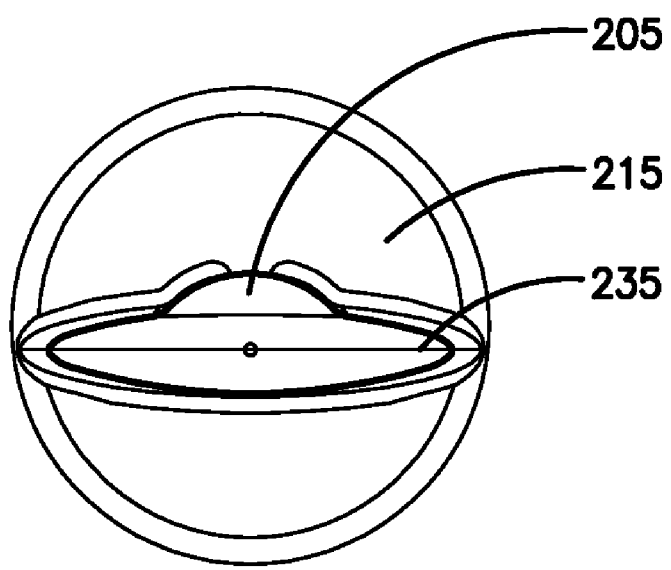

A third embodiment includes the addition of a guide member to guide the activating pin or screw. Fastener 800 (FIG. 8A) is similar to fastener 200, except a screw guide 810 replaces screw covering rib 203 (FIGS. 2C and 2D). Guide 810 contains a bore 811, indicated by dashed lines 812. Hole 205 and guide 810 share an axis 815 that lies above the plane containing the body, comprising sections 825 and 830, of fastener 800. A second axis 816 lies in the plane containing sections 825 and 830.

FIGS. 8B and 8C show fastener 800 installed and activated in wallboard 801. An activating pin 835 (FIG. 8B) enters fastener 800 through hole 205, passes through bore 811 in guide 810 and activates fastener 800 by pushing against cam 805, thereby causing rear section 830 to rotate downward. Guide 810 (FIG. 8A) ensures that the activating pin remains coaxial with hole 205, i.e., it prevents the activating pin from skewing upward. Shaft 836 of pin 835 prevents clockwise rotation of section 830 after fastener 800 is installed.

FIG. 8C shows a front view (from the left in FIG. 8B) of fastener 800 in the activated condition behind wallboard or other surface 801.

FOURTH EMBODIMENT

Figure 9A:
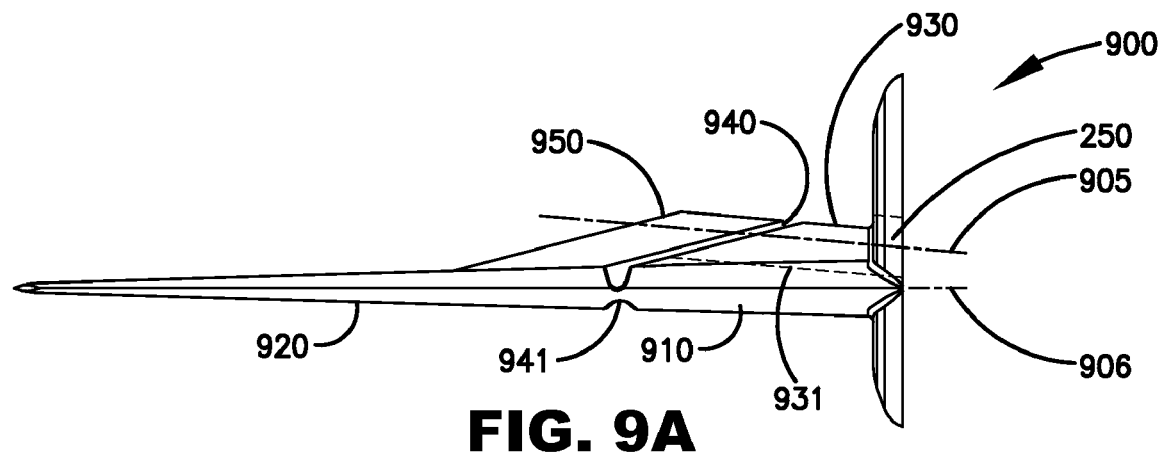
FIGS. 9A through 12B show additional embodiments.
Figure 9B:
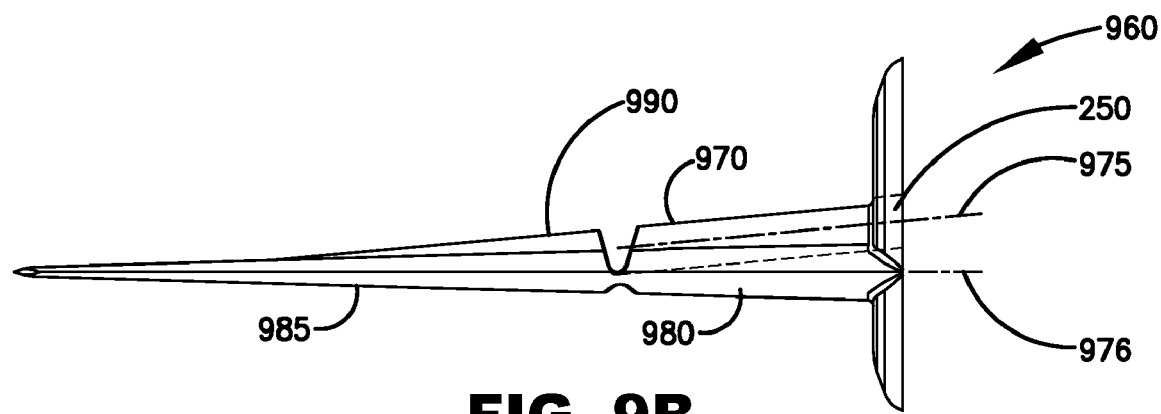
Figure 9C:
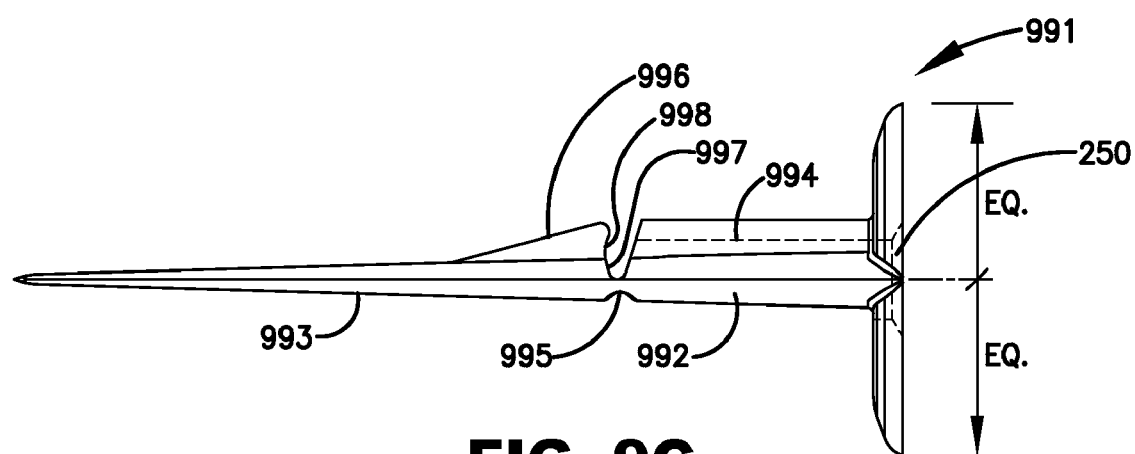

Description and Operation—FIGS. 9A-9C

In FIGS. 9A and 9B, the activating pins enter the fasteners at an angle. In FIG. 9A, a fastener 900 has a distal section 920 and a proximal section 910. The fastener has a hole 250 which communicates with or extends into bore 931 that has an axis 905 that is rotated clockwise about 7 degrees with respect to an axis lying in the plane containing sections 910 and 920. Bore 931 is in guide 930 and is coaxial with hole 250. Hole 250 and guide 930 cooperate to guide an activating pin (not shown) into contact with a front side 940 of a cam follower 950. When the pin is fully inserted, it cams follower 950 and section 920 counter-clockwise at hinge point 941, thus activating fastener 900.

FIG. 9B shows a fastener 960 with an entry hole 250 tilted counter-clockwise with respect to the plane of sections 910 and 920. Fastener 960 includes hole 250 and bore 970 with an axis 975. Axis 975 is rotated counter-clockwise with a parallel axis 976 lying in the plane containing sections 980 and 985. A pin (not shown) is inserted into hole 250 and passes through guide bore 970 until it impinges on cam 990. As the pin is inserted further it forces rear section 985 to rotate counter-clockwise, activating fastener 960.

FIG. 9C shows a fastener 991 that includes an entry hole 250 with center and axis in or near the plane containing sections 992 and 993. Sections 992 and 993 are connected by a hinge 995. Section 993 includes a camming portion 996 with a detent 998. Detent 998 extends below the plane of sections 992 and 993. A pin of sufficient length (not shown) entering hole 250 will contact the detent portion 998 of projection 996 at the location indicated by line 997. When the pin is urged against detent portion 998 at location 997, a rotational moment of torque occurs at hinge 995. Upon further urging, section 993 rotates counterclockwise at hinge 995, thereby activating fastener 991.

FIFTH EMBODIMENT

Figure 10A:
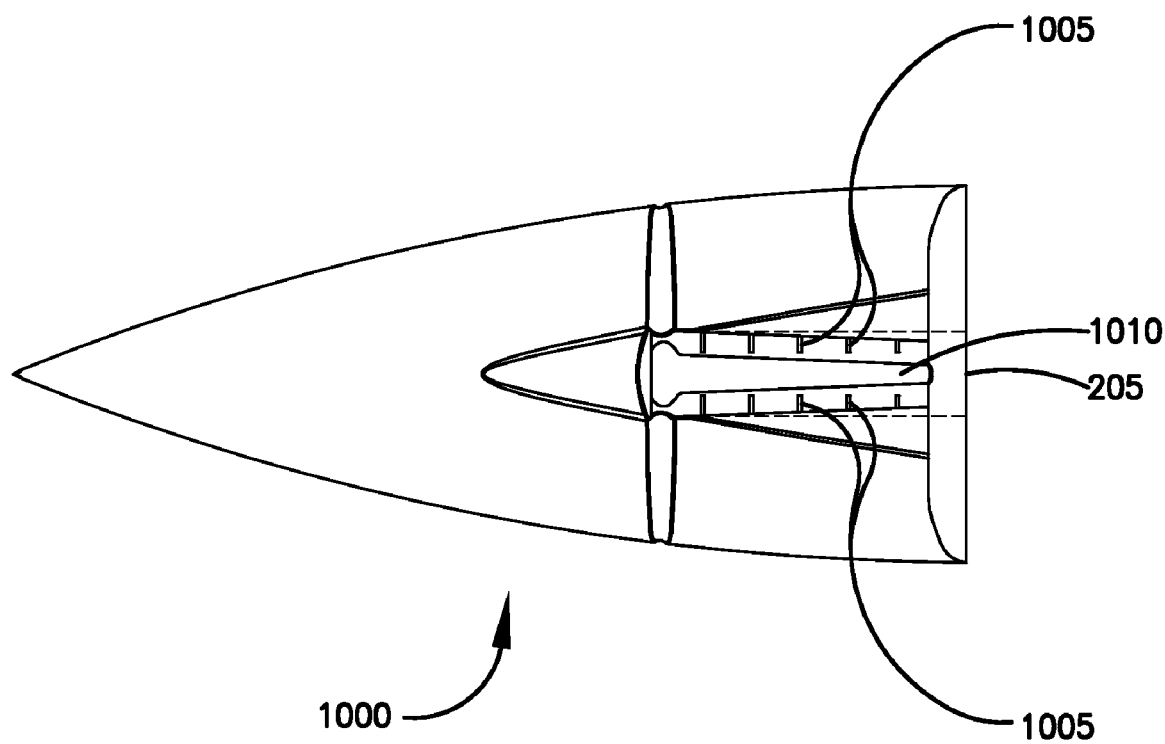

Description and Operation—FIGS. 10A Through 10C

FIG. 10A shows a top view of a fastener 1000. Fastener 1000 is similar to fastener 200 (FIG. 2A), except for the addition of a series of wings 1005 (FIG. 10A) in bore 1010, thinned sections 1015, and one or more notches 1017 in annulus 1020 (FIG. 10B). The function of notches 1017 is discussed below in connection with FIG. 13 and a tool 1360.

Wings 1005 permit the use of activating pins or screws (not shown) with diameters smaller than entry hole 205. The threads of a screw with a diameter smaller than that of entry hole 205 can engage wings 1005 during activation of fastener 1000. In FIGS. 10B and 10C, wings 1005 are shown as they appear through hole 205.

A larger screw (not shown), with a diameter equal to that of hole 205, can be used. When inserted it simply deforms wings 1005 and moves them out of the way as it moves in to activate fastener 1000.

This embodiment can also accommodate screws and pins that with diameters greater than that of hole 205. FIGS. 10B and 10C show thinned sections 1015 in annulus 1020. When a screw or pin (not shown) with a diameter larger than that of hole 205 is inserted into hole 205 and on into fastener 1000, thinned sections 1015 will break, as shown in FIG. 10C, allowing the screw or pin to proceed on into fastener 1000, thereby activating it. The resultant expansion of annulus 1020 of fastener 1000 locally compresses the wallboard (not shown) surrounding fastener 1000. This results in increased holding power of fastener 1000. Fastener 1000 is removed in the same fashion as that shown for the previous embodiments.

SIXTH EMBODIMENT

Figure 11A:
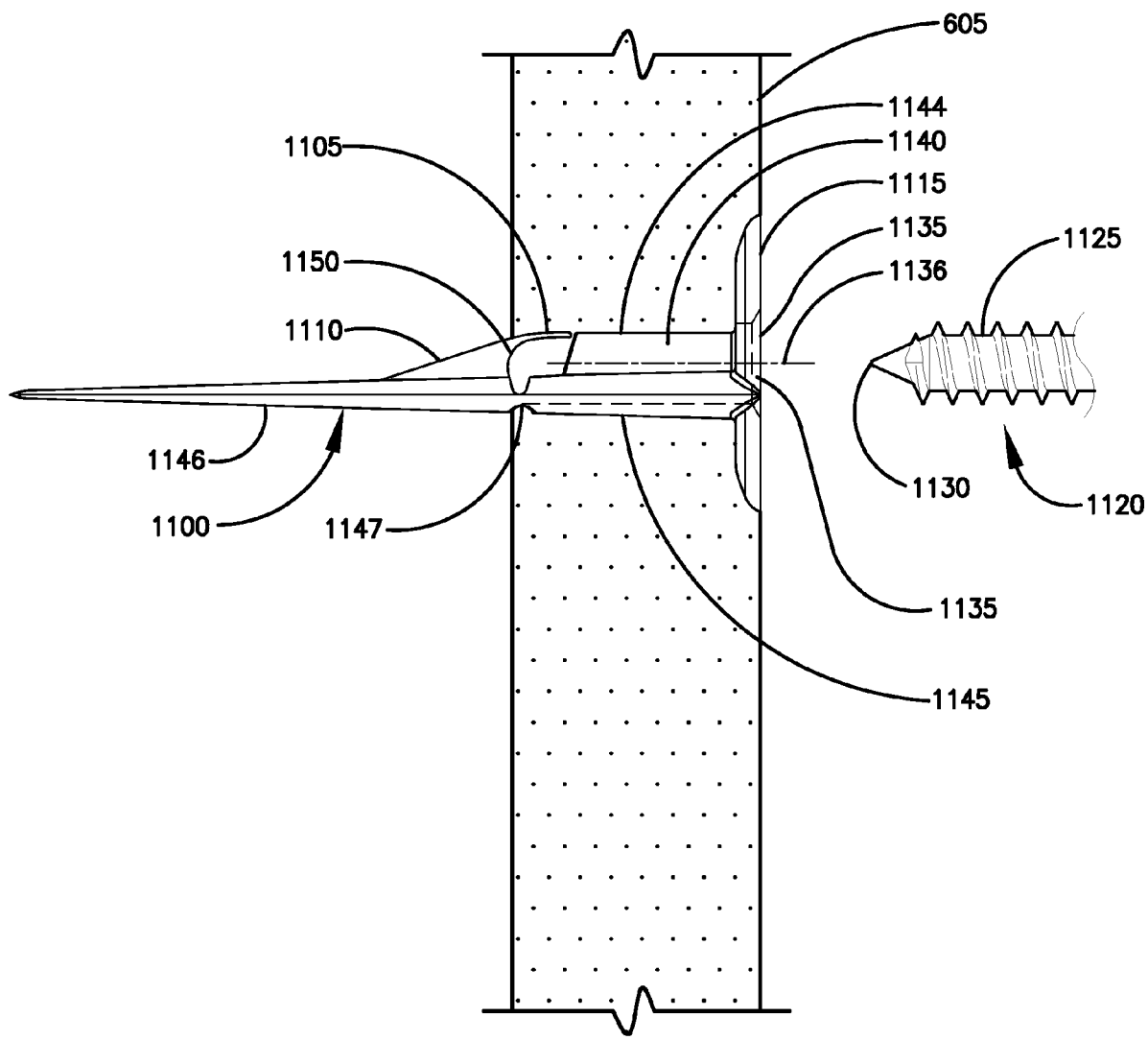
Figure 11B:
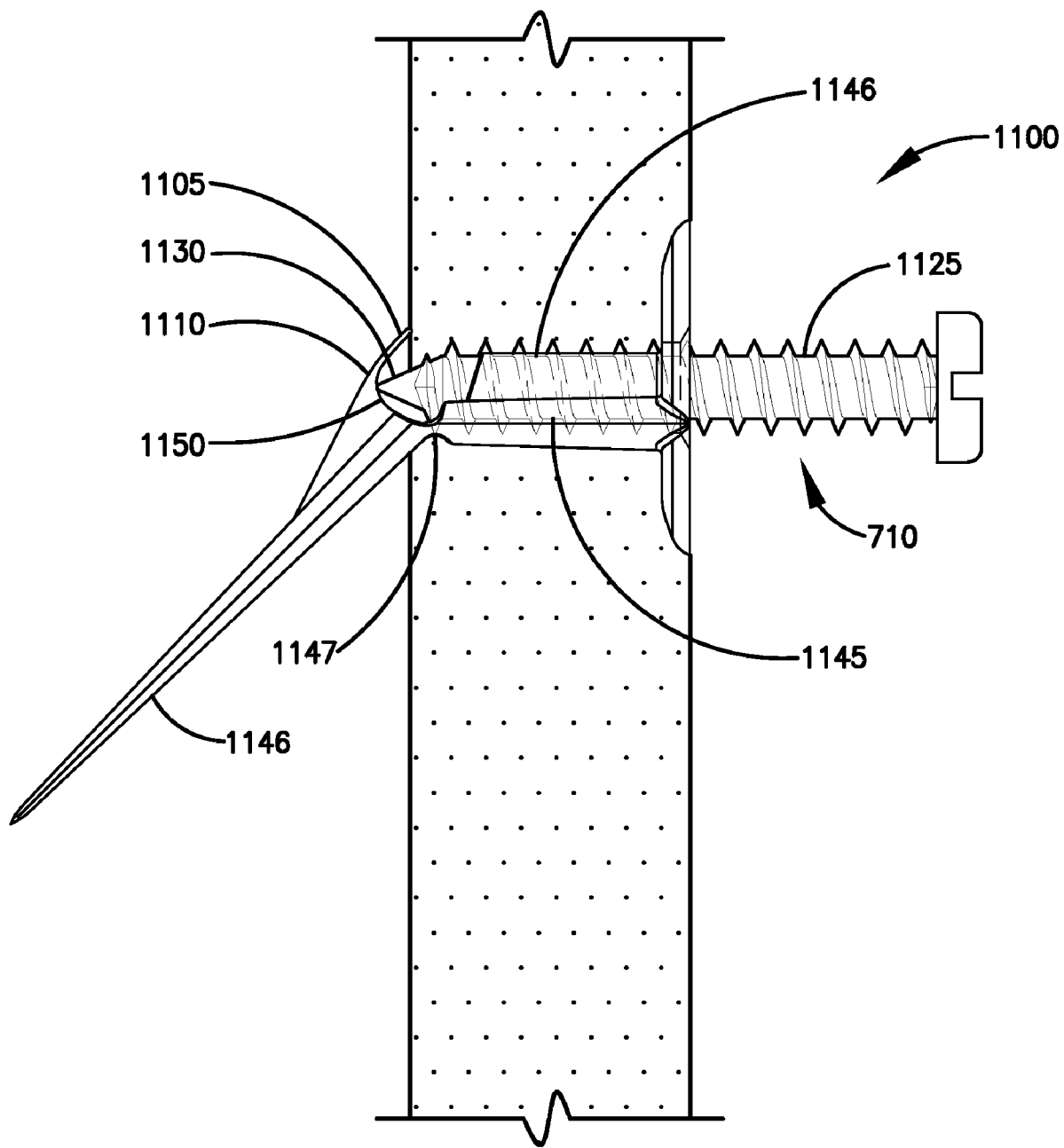
Figure 11C:
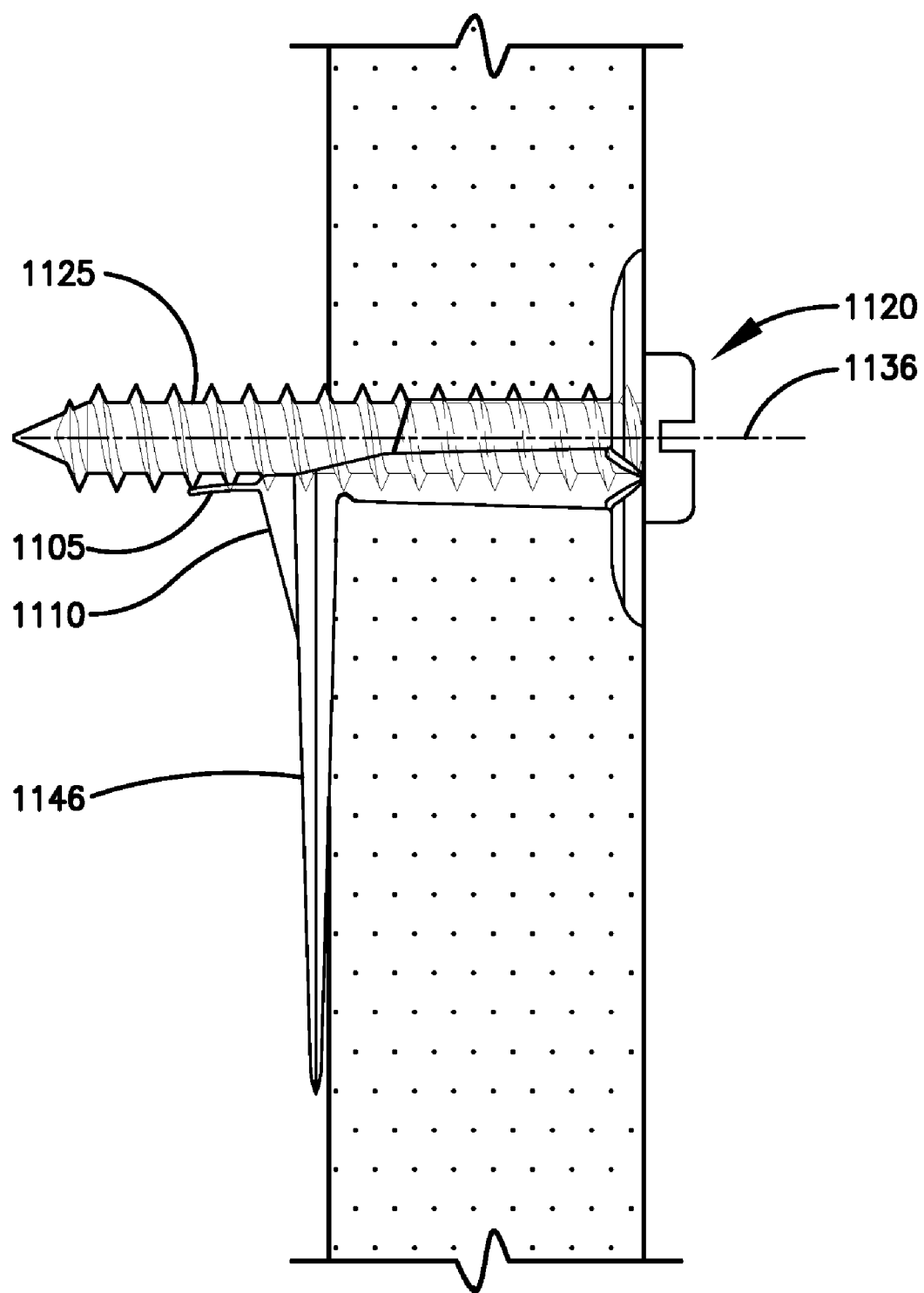

Description and Operation—FIGS. 11A Through 11C

An anchor 1100 shown in FIGS. 11A through 11C is similar to that shown in FIGS. 7A-7C, except that cam 705 (FIG. 7A) is replaced with a finger 1105 (FIG. 11A) that extends from projection 1110 rearward toward annulus 1115 of anchor 1100 (FIG. 11A). Anchor 1100 has front and rear sections 1145 and 1146, respectively. Sections 1145 and 1146 are joined by hinges 1147, of which only one is shown in this view. As in previous embodiments, axis 1136 of hole 1135 lies above the plane containing sections 1145 and 1146, prior to activation.

An activating pin 1120 (shown threaded) with a shaft 1125 and a tip 1130 is screwed into hole 1135 in annulus 1115. A guide bore 1140 in rib 1144 guides pin 1120 toward projection 1150 in projection 1110. Pin 1120 can be threadless, in which case it would be inserted by pushing it straight in, e.g., by hammering.

When tip 1130 of pin 1120 pushes against detent 1150, rear section 1146 pivots at hinges 1147, causing section 1146 to rotate counterclockwise, or downward.

As pin 1120 progresses farther into anchor 1100, finger 1105 bends with respect to projection 1110, rotating counterclockwise to its final resting position shown in FIG. 11C. When compared with the previous embodiments, finger 1105 provides additional frictional surface to bear against shaft 1125 of pin 1120, further resisting pull-out of pin 1120 from anchor 1100.

SEVENTH EMBODIMENT

Figure 12A:
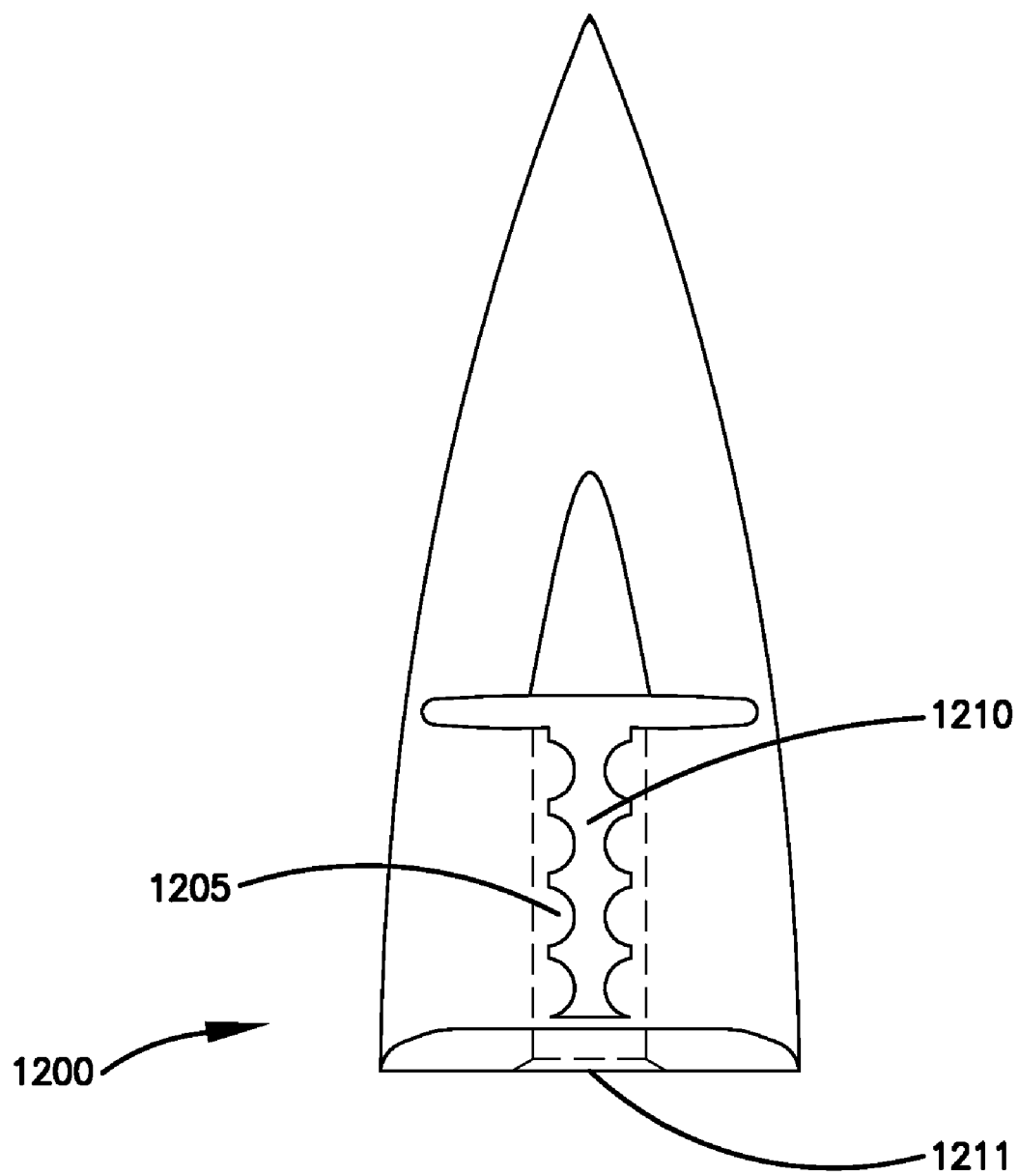
Figure 12B:
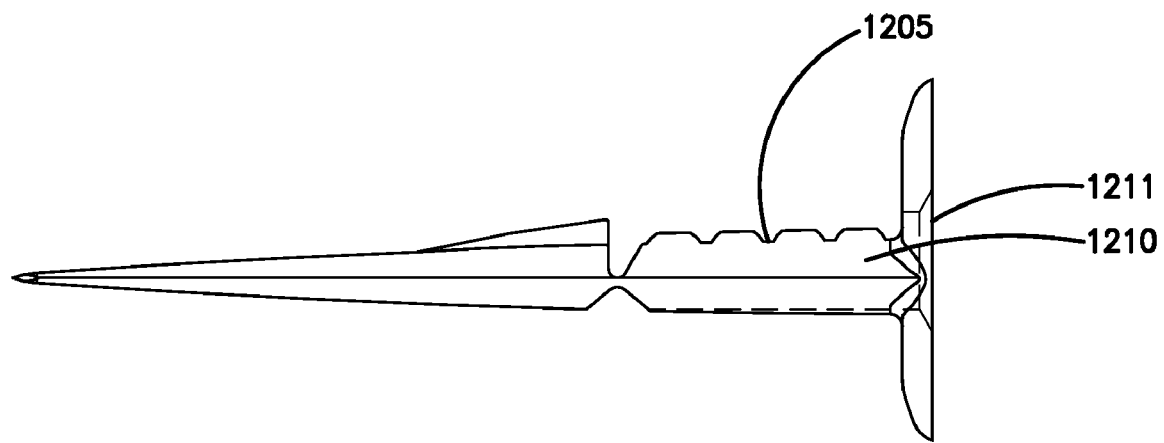

Description and Operation—FIGS. 12A and 12B

The embodiment shown in FIGS. 12A and 12B shows a fastener 1200 that is similar to that shown in FIGS. 10A through 10C, except wings 1005 (FIGS. 10A-10C) are replaced by a series of projections 1205. FIGS. 12A and 12B are top and side views, respectively, of the present embodiment. Projections 1205 extend from the walls of bore 1210, periodically reducing the diameter of bore 1210. Bore 1210 is collinear with entry hole 1211. Any pin (not shown) of sufficient length with diameter less than entry hole 1211 and greater than the space between opposing surfaces of projections 1205 can be used to activate fastener 1200. A pin with a diameter less than or equal to that of entry hole 1211, but equal to or greater than the spacing between projections 1205, is secured in fastener 1200 by contact with projections 1205. A pin with a diameter greater than the space between projections 1205 simply deforms the projections as it is forced into fastener 1200, thereby increasing the force required to remove the pin from fastener 1200.

EIGHTH EMBODIMENT

Description and Operation—FIGS. 13A and 13B

FIG. 13A shows a fastener 1300 similar to the one shown in FIG. 2, although any of the above embodiments can be arranged for use in the present application. Fastener 1300 has previously been installed in a bilayered sheet of material 1305. Sheet 1305 can be wallboard, or any other material. In addition, material 1305 is shown as comprising layers 1306 and 1307 of the same or dissimilar materials. Fastener 1300 is alternatively used to hang objects in sheet 1305, or to fasten layers 1306 and 1307 together, or both.

Fastener 1300 has been inserted into sheet 1305 so that inner surface 1310 rests against outer surface 1320 of sheet 1305. Inner edge 1325 of annulus 1315 is exposed in this application.

A pin 1330 with a shaft 1335, tip 1340, and head 1345 has been manually inserted into fastener 1300 until tip 1340 of pin 1330 has contacted projection 1350 of fastener 1300.

The activation of fastener 1300 is accomplished with a tool 1360 (FIG. 13B). Tool 1360 comprises two or more fingers 1362, 1363, attached to arms 1364 and 1365, respectively. Fingers 1362 and 1363 terminate in narrowed tips that fit into notches 1017 in annulus 1020 (FIGS. 10A and 10B). Arms 1364 and 1365 are anchored to the body of tool 1360. The body of tool 1360 further comprises a plunger 1370 that moves in a direction collinear with the axis of pin 1330. When shaft 1335 of pin 1330 is smooth or ratcheted, pin 1330 is preferably driven straight into fastener 1300. When shaft 1335 of pin 1330 is threaded, plunger 1370 of tool 1360 supplies a rotating instead of plunging action to advance pin 1330.

Arms 1364 and 1365 are secured to the body of tool 1360 that comprises an apparatus (not shown) that provides a driving force to plunger 1370. This driving force can be supplied by an electric, pneumatic, hydraulic, spring loaded, manual, or any other suitable force. Plunger 1370 moves horizontally between positions A and B in this drawing.

To activate fastener 1300, tool 1360 is placed as shown in FIG. 13B. Fingers 1362 and 1363 are moved to positions behind annulus 1315, and in contact with edge 1325 and surfaces 1366 of notches 1017. Plunger 1370 is initially resting at position A, and pin 1330 is initially resting at the position shown in FIG. 13A. Upon activation of tool 1360, plunger 1370 moves from position A to position B, pushing against head 1345 of pin 1330 while pulling annulus 1315, thereby forcing pin 1330 into fastener 1300 without applying any force against sheet 1305. Plunger 1370 is then withdrawn to its original position A and tool 1360 is removed from now-fully-activated fastener 1300.

Tool 1360 activates fastener 1300 without permitting the transmission of the activating forces from fastener 1300 to materials 1305 being fastened. Fastener 1300 can be any of the previously mentioned embodiments or the like, and need only have surfaces engageable by a tool like 1360 provided on its proximal portion. The activating force supplied by plunger 1370 is balanced by equal and opposite forces supplied by fingers 1362 and 1363 secured against edge 1325 of annulus 1315 and surfaces 1366 in notches 1017. This application is useful when material 1305 is thin, flexible, friable, or easily displaced or whenever it is desirable to prevent the forces of activating a fastener from being transmitted to the material(s) being fastened. It is also useful when material 1305 comprises two or more layers that are to be fastened together.

NINTH EMBODIMENT

Description and Operation—FIGS. 14A Through 14G

Figure 14A:
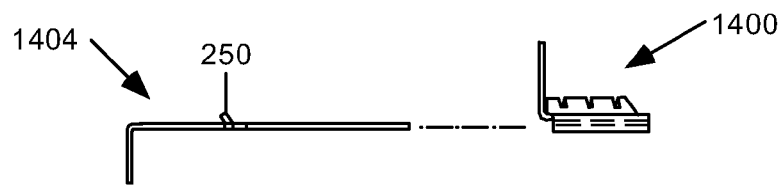
FIGS. 14A through 16 show additional embodiments.

FIG. 14A shows an exploded view of a fastener that can be made in one or more pieces. When made in two pieces, a top section 1400 and a bottom section 1404 (shown horizontally in FIG. 14A) are formed of sheet metal, such as steel. Section 1400 includes upper portions 202'-C and 202'-D (FIGS. 14B and 14F) of a circular annulus joined by a right-angle bend to a domed section 1405 (FIGS. 14B and 14C) having female threads 1406. Section 1404 (FIG. 14A) comprises lower portions 202'-A and 202'-B (FIG. 14F) of the same annulus, joined by a right angle bend with an extended piece comprising front portion 220 (FIG. 14B), distal end 235, and tip 240. In addition, female threads or slots 1406' (FIG. 14D) along with female threads 1406 (FIG. 14B) create a channel to accept a screw or pin. In the case of a screw 1420 (FIG. 14G) threads or slots 1406 and 1406' positively engage the threads on screw 1420. Section 1400 is then crimped in place by crimp 1407 on section 1404 (FIGS. 14A and 14D). Thereafter, the two sections function as a single unit comprising the fastener.

Figure 14B:
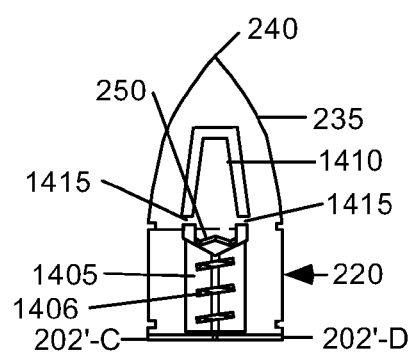
Figure 14C:
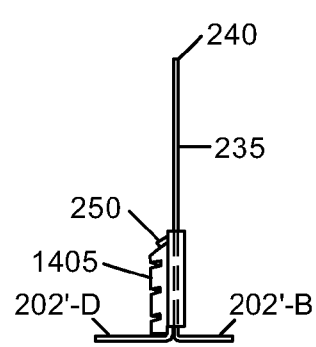
Figure 14D:
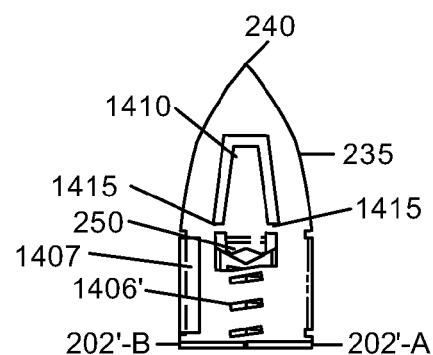

When made in a single piece, all portions are stamped and formed from a single piece of sheet metal, then bent into the shapes shown in FIGS. 14B through 14F. As in the earlier examples, this fastener includes a rear or proximal end 220 with an annulus 202', and a front or distal end 235 that terminates in a sharpened tip 240 (FIG. 14B). For ease of manufacture, annulus 202' comprises four sections 202'A through 202'D. In the assembled fastener, these sections function as a unit, forming the front end of the fastener.

Figure 14E:
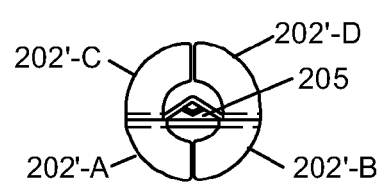
Figure 14F:
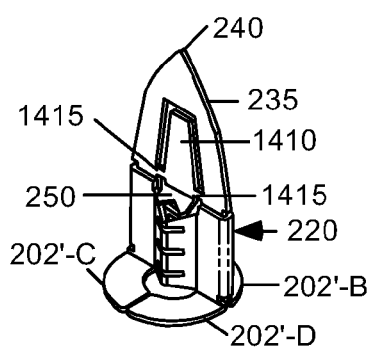

FIGS. 14B through 14F respectively show top, side, bottom, frontal, and perspective views of the assembled fastener. Section 1400 includes a domed portion 1405 with female threads 1406 (FIG. 14B) that is a continuation of an entry hole 205 (FIG. 14E). Section 1405 includes a projection 250, a finger 1410, two hinge regions 1415, and female threads 1406' that lie opposite female threads 1406. Finger 1410 extends rearward from projection 250 in section 1404.

Hole 205 is formed by opposing threads 1406 and 1406' and the pitch of the threads engage a screw of standard size, such as American thread size 6-32, about 3.5 mm diameter with 1.26 threads/mm. Other screw sizes, pitch, diameter, etc., can be used. Optionally, a larger screw can be used. In this case, sections 1404 and 1405 stretch locally to admit the screw.

Figure 14G:
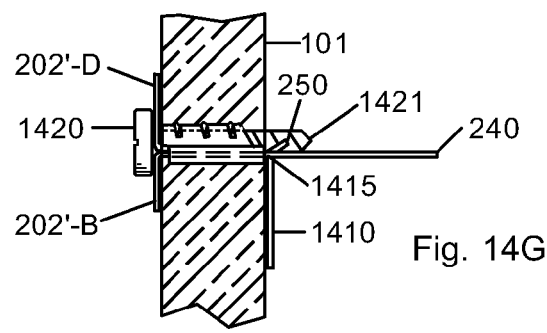

FIG. 14G shows the present fastener in use in wallboard 101. Tip 240 has been driven into wallboard 101 either by hammering or manual force. With annulus 202' resting against the outer surface of wallboard 101, a screw 1420 with a tip 1421 is inserted into hole 205 (FIG. 14E) and turned so that tip 1421 engages projection 250. As screw 1420 advances further, tip 1421 engages projection 250 urging it away from hole 205, thereby forcing finger 1410 to rotate about hinge points 1415, thus securing the fastener in wallboard 101.

The upwardly facing V-shaped portion of projection 250 engages the tip of screw 1420 (FIG. 14G) a short distance to the left of hinge point 1415, and guides the body of screw 1420 as it is urged into the fastener. Projection 250 remains in firm contact with the tip and body of screw 1420, and may even be bent downward under the force exerted by screw 1420 as it continues into the fastener. This provides additional leverage on finger 1410, further compressing wallboard 101 and thereby strengthening the installation of the fastener.

The angular position of projection 250 with respect to the plane of rear portion 235 compresses, rather than tearing, the material comprising wallboard 101 as the fastener is inserted. Thus section 1405 enters wallboard or other material 101 without causing blowout or damage to the wall. A stronger installation results.

If desired, screw 1420 can then be withdrawn a short distance and an object (not shown) can be suspended therefrom. Alternatively, wallboard 101 can comprise two or more layers of wallboard, metal, wood, plastic, or any other material. In this case, the fastener can be used to secure the layers together.

TENTH EMBODIMENT

Figure 15A:
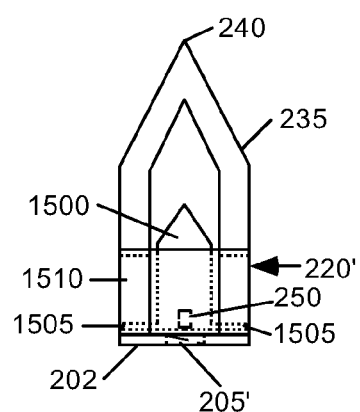
Figure 15B:
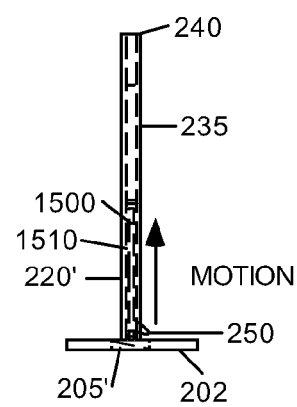
Figure 15C:
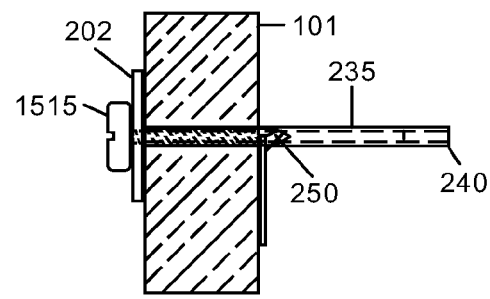

Description and Operation—FIGS. 15A Through 15C

FIGS. 15A and 15B show an embodiment similar to that in FIGS. 14A through 14G. In this embodiment, finger 1410 and bendable hinge points 1415 (FIGS. 14B, 14D, 14F, and 14G) are replaced with a sliding finger 1500 having a pair of hinge pins 1505 and a projection 250 that extends above the plane of the finger. Front section 220' of the fastener includes a hollow channel 1510 within which finger 1500 and pins 1510 slidably move. Annulus 202 includes a front hole 205' which is threaded.

FIG. 15C shows the fastener secured in wallboard, or multiple layers, 101. Tip 240 of the fastener has been driven into wallboard 101 until the rear surface of annulus 202 is in contact with the front surface of wallboard 101. A screw 1515, either with threads to match those of hole 205' or of the self-threading type, is turned by a user (not shown) and advances into the fastener via hole 205. As screw 1515 advances, it pushes finger 1500 inward within channel 1510. When pins 1505 reach the rear end of channel 1510, finger 1500 stops its translational motion. As screw 1515 advances farther, the tip of screw 1515 pushes against projection 250 on finger 1500, causing finger 1500 to rotate downward, as shown in FIG. 15C, thus securing the fastener within wallboard 101.

Figure 16:
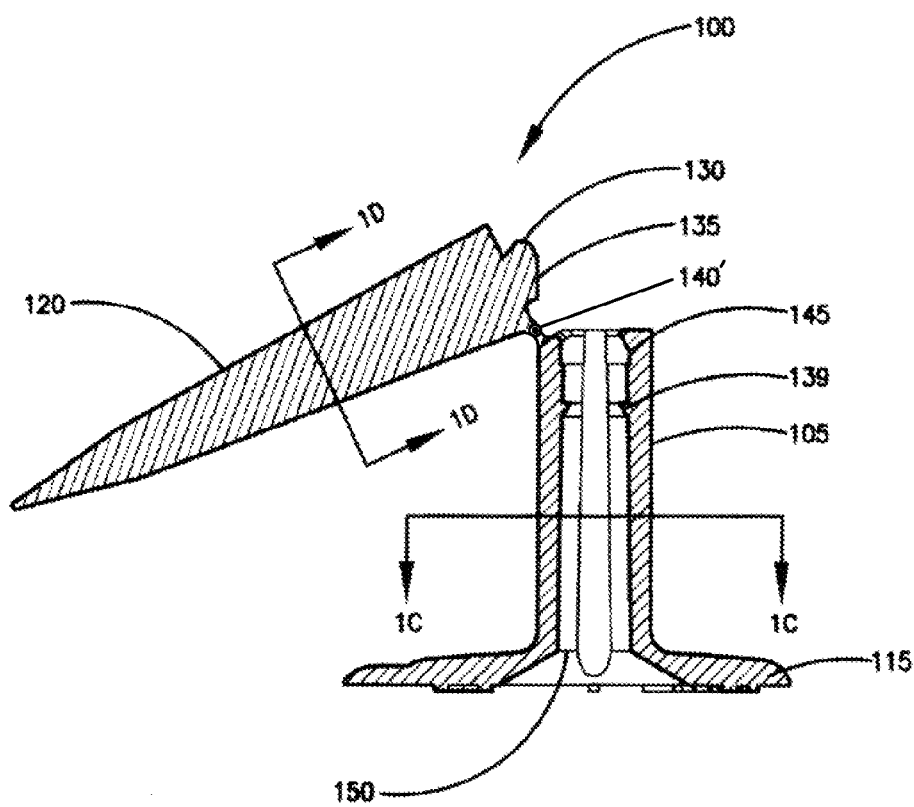

Alternative Hinge—Description and Operation—FIG. 16

Figure 1B:
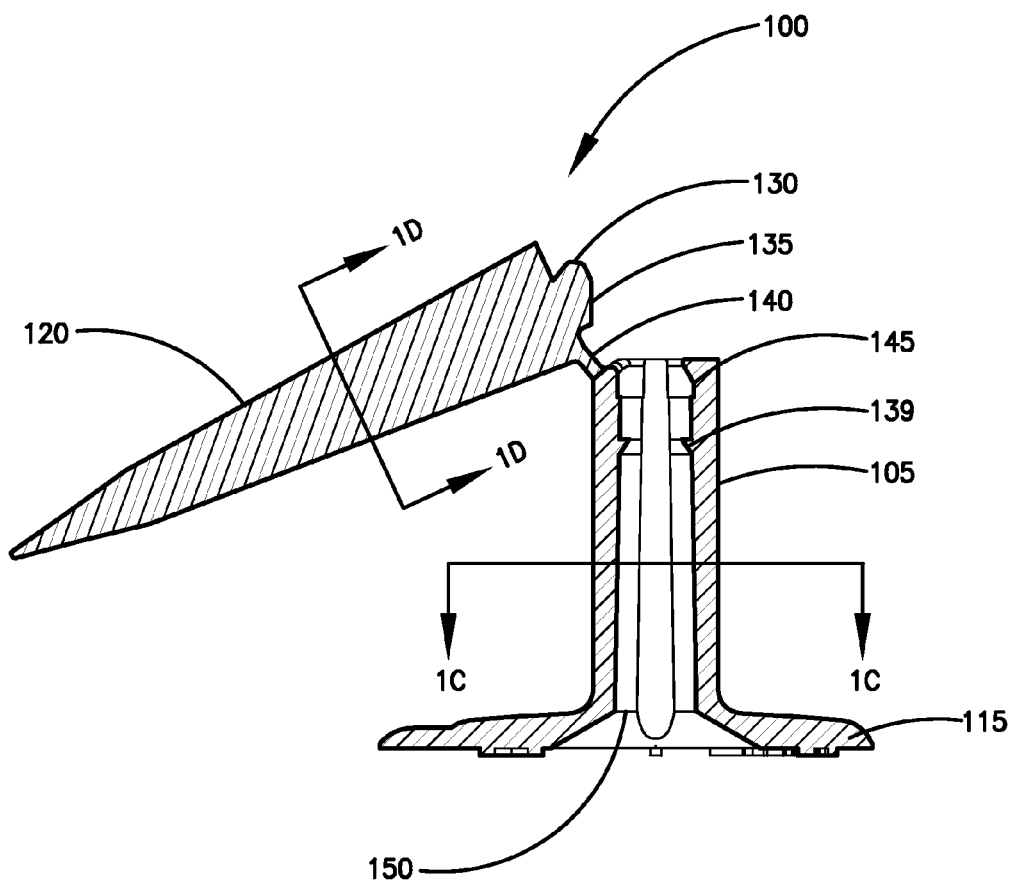
Figure 1D:
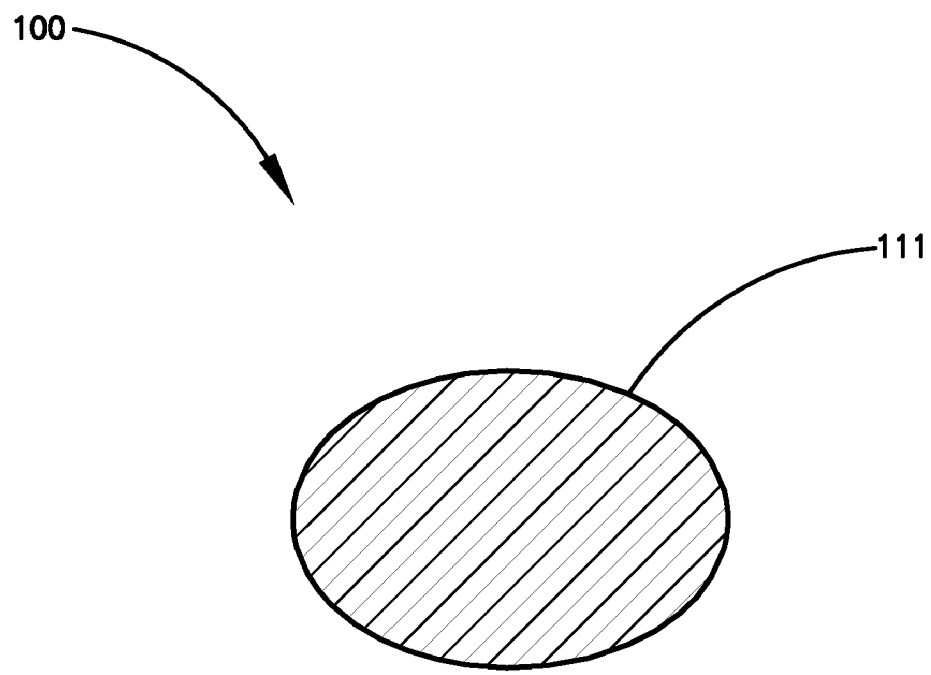
Figure 1E:
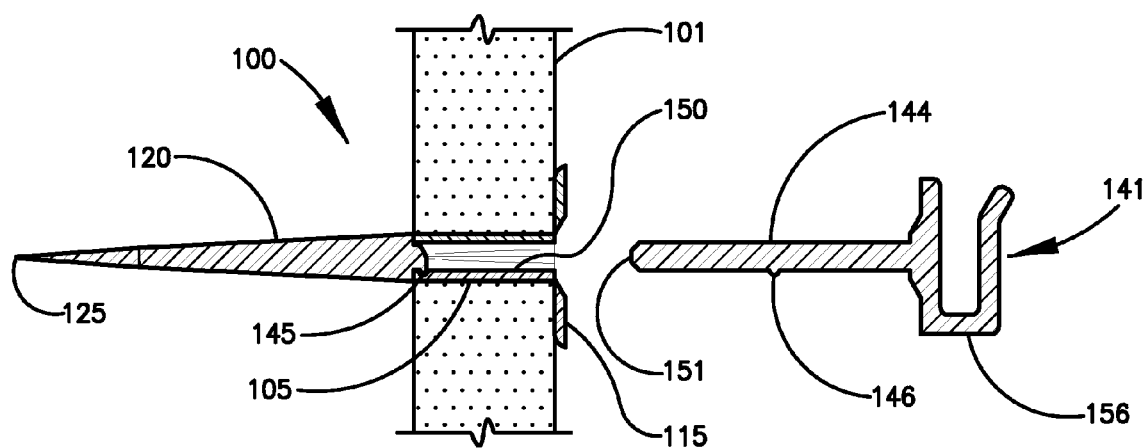
Figure 1F:
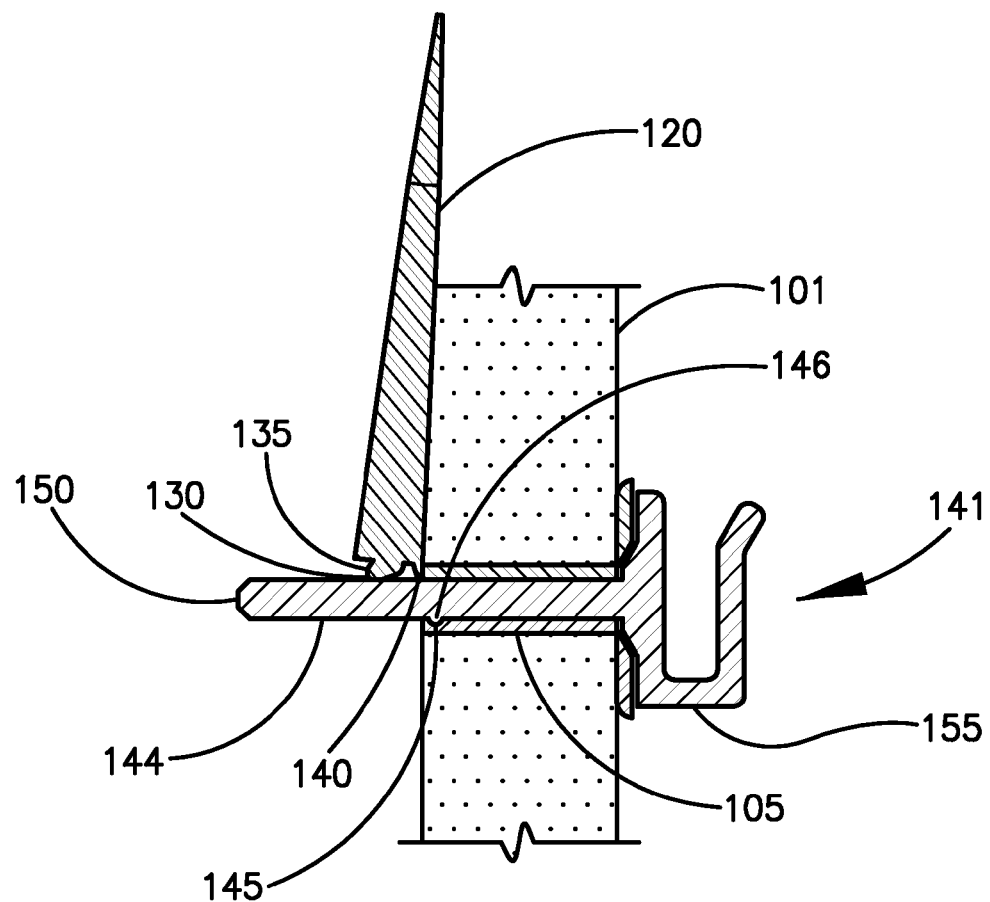

Instead of a living hinge 140, as shown in FIG. 1B, a conventional hinge 140' (FIG. 16) having two similar plates joined by a pin can be used.

SUMMARY, RAMIFICATIONS, AND SCOPE

In several aspects, our new fastener has a knife-like profile and an open channel to reduce blowout of the wallboard material. No alignment fins such as those used in prior-art fasteners are required. This thin profile also leaves a smaller hole in the wall when the fastener is removed. In addition, the wide, flat body and inclusion of two hinges on one large leg, as opposed to the prior-art designs that incorporate a single hinge on a single small leg, increases load bearing capability, increasing the strength of the installation. The flat shape allows much greater torque forces to be applied from a screw pin than are possible with a cylindrical shape, thus affording a tighter grip and less damage to the wall as the anchor is stressed rotationally. The open body design allows the use of a multiplicity of screw sizes. The open body of the fastener reduces displacement of wallboard material, thereby maintaining integrity of the wall and increasing the holding strength of the fastener. The off-center alignment allows the screw body to apply more leverage on the projection cam bump. The open channel design allows the inner section to bend more than 90 degrees, resulting in strong installation in thin wall board. No ribs or teeth are required to keep our design in the wall, as was the case in prior-art designs. The fastener accommodates all the pin designs of the design in our co-pending application. In addition, because of the internal partial threads on one hand, and the indented, friable front annulus on the other hand, the diameter of a pin or screw used in the present design can be greater or less than the diameter of the entry hole on the front of the fastener.

While the above description contains many specificities, these should not be considered limiting but merely exemplary. Many variations and ramifications are possible.

The entry hole of the fastener can be tilted or off-center and still be arranged to guide an activating pin to the cam follower surface. In addition, an on-center entry hole can be used. In this configuration, activation is accomplished by pushing the activating pin against the lower-than-center, curved face of the cam.

One size anchor can be used for different wallboard thicknesses. In the case of wallboard that is thicker than that for which the anchor is designed, the front section will rotate less than 90 degrees with respect to the axis of the anchor. This causes local vise-like compression of the wallboard beneath the anchor in the vise formed between the rear section and the annulus. The degree of compression is determined by the anchor used and the thickness of the wallboard. In the case of wallboard that is thinner than that for which the anchor is designed, the embodiments shown in FIGS. 7 and 9 are used.

The fastener can be used to secure items to thin materials, such as sheet metal, plastic, and the like. It can be activated by a tool that applies the activating force only to the fastener and not the materials into which the fastener is secured.

The sizes, materials, shapes, and interconnections of the various parts can be changed from those discussed.

While the present system employs elements which are well known to those skilled in the art of wall anchor design, it combines these elements in a novel way which produces a new result not heretofore discovered. Accordingly the scope of this invention should be determined, not by the embodiments illustrated, but by the appended claims and their legal equivalents.

The invention claimed is:

1. An anchoring fastener, comprising:
an elongated member comprising a distal section and a proximal section, said distal and proximal sections being coaxial in an initial configuration and each having an axis,
said proximal section having a hole therethrough and having a side facing said distal section in said initial configuration,
said hole having an axis parallel to said axes of said distal and proximal sections, said axis of said hole being offset from said axis of said distal section so that said hole is offset from said distal section,
said distal and proximal sections being pivotally joined at a pivot so that said distal section can pivot with respect to said proximal section,
said distal section having a sharpened forward end on said axis of said distal section,
said distal section having a projection with a surface facing said proximal section in said initial configuration,
said surface of said distal section that faces said proximal section in said initial configuration constituting a cam follower portion,
said cam follower portion and said hole of said proximal section being offset and positioned so that when an elongated activating member is inserted through said hole, said activating member will meet said cam follower portion at a location farther from said axis of said distal section and from said pivot than if said hole were coaxial with said axis of said distal section, thereby to cause said distal portion to pivot away from said proximal section to an expanded or anchoring configuration, whereby said activating member will meet said cam follower portion with increased off-axis leverage so as to provide increased pivotal force against said distal section and tend to pivot said distal section through an angle greater than 90 degrees.

2. The anchoring fastener of claim 1 wherein said surface of said distal section is concave.

3. The anchoring fastener of claim 1 wherein the cross-section of said proximal section is selected from the group consisting of flattened oval and flat.

4. The anchoring fastener of claim 1 wherein said anchor is made of a material selected form the group consisting of plastics and metals.

5. The anchoring fastener of claim 1, further including said activating member, said activating member being selected from the group consisting of pins and screws.

6. The anchoring fastener of claim 5 wherein said activating member is selected from the group consisting of threaded, ratcheted, and smooth-sided pins.

7. The anchoring fastener of claim 1 wherein said hole extends through said proximal section and the axis of said hole intersects said cam follower portion.

8. The anchoring fastener of claim 7, further including a guide member coaxial with said hole.

9. The anchoring fastener of claim 7, further including a plurality of wings within said hole to engage threads of an activating screw inserted into said hole.

10. The anchoring fastener of claim 7, further including a plurality of projections within said hole.

11. The anchoring fastener of claim 1 wherein said surface constituting said cam follower portion is selected from the group consisting of flat and concave.

12. The anchoring fastener of claim 1 wherein said surface constituting said cam follower portion is positioned at a non-perpendicular angle to said axis of said distal section.

13. The anchoring fastener of claim 1, further including a screw guide having an axis collinear with said axis of said hole and located at the end of said proximal section opposite said hole.

14. The anchoring fastener of claim 1, further including an annulus in said proximate section, said annulus having a side facing said distal section in said initial configuration, said annulus including an edge suitable for gripping by an activating tool.

15. The anchoring fastener of claim 1 in which the axis of said hole is at an angle to said axis of said proximal section.

16. A method for anchoring an object, comprising:
providing an anchoring fastener having contiguous distal and proximal sections, said distal and proximate sections being coaxial in an initial configuration,
said proximal section including an annulus,
said distal section having a sharpened tip at one end and being pivotally joined to said proximal section at its opposite other end, said opposite end also having a cam follower surface facing said proximal section and arranged so that said distal section will pivot to an angle with said proximal section when force is applied to said cam follower surface,
said proximal section having a hole extending therethrough, said hole having an axis that intersects said cam follower surface,
said distal section having an axis, said sharpened tip lying on said axis,
said axis of said hole in said proximal section being offset from said axis of said distal section so that when said anchor is in said initial configuration and an activating member inserted through said hole in said distal section, said activating member will contact said cam follower surface at a location spaced farther from said axis of said distal section than if said hole were coaxial with said distal section so as to provide increased off-axis leverage on said cam follower surface, selecting a location on a surface that has a hollow volume therebehind, passing said sharpened tip and said anchor through said surface at said location until said annulus of said proximal section is in contact with said surface, providing an elongated activating member, inserting said activating member into said hole until said activating member meets said cam follower surface and forces said distal section to pivot away from said proximal section, whereby insertion of said activating member will force said distal section to pivot away from said proximal section through an angle of 90 degrees or greater to an expanded or anchoring configuration.

17. The method of claim 16 wherein said activating member is selected from the group consisting of screws and pins.

18. An anchoring fastener, comprising:

an elongated member comprising a distal section and a proximal section, said distal and proximal sections each having an axis, said distal and proximal sections being coaxial in an initial configuration, said proximal section having an annulus and a hole therethrough and having a side facing said distal section in said initial configuration, said hole in said proximal section having an axis, said axis of said hole being offset with respect to said axis of said distal section, said distal and proximal sections being pivotally joined at a pivot so that said distal section can pivot with respect to said proximal section, said distal section having a sharpened forward tip lying on said axis of said distal section, said distal section having a surface facing said side of said proximal section that faces said distal section, said surface constituting a cam follower portion, said hole in said proximal section and said cam follower surface being offset and positioned so that when said anchor member is in said initial configuration and an elongated activating member is inserted through said hole of said proximal section, said activating member will meet said cam follower portion at a location spaced farther from said pivot than if said hole in said proximal section and said axis of said distal section were coaxial, so as to force said distal section to pivot away from said proximal section with increased offset leverage and through an angle of 90 degrees or greater to an expanded or anchoring configuration.

19. An anchoring fastener, comprising:

an elongated member comprising a distal section and a proximal section, said distal and proximal sections each having an axis, said distal and proximal sections being coaxial in said-initial configuration said proximal section having an annulus and a hole therethrough and having a side facing said distal section in said initial configuration, said hole having an axis parallel to said axes of said distal and proximal sections, said distal and proximal sections being pivotally joined at a pivot so that said distal section can pivot with respect to said proximal section, said distal section having a sharpened forward end and a projection with a cam follower surface facing said side of said proximal section, said cam follower surface and said hole in said distal section being offset and positioned so that when said anchor member is in said initial configuration and an elongated activating member is inserted through said hole of said proximal section, said activating member will meet said cam follower portion at a location spaced farther from said pivot than if said hole and said axis of said distal section were coaxial o as to force said distal section to pivot away from said proximal section with increased offset leverage and through an angle of 90 degrees or greater to an expanded or anchoring configuration.

20. A method for fastening a plurality of layers together, comprising:

providing a fastener having distal and proximal sections, said proximal section including a head of greater dimension than the largest axial cross section of said distal and proximal sections, said head having a distal side and a proximal side, said proximal section having a hole extending therethrough toward said distal section, said head having an engageable surface on said distal side that can be engaged by a predetermined tool, said head having means for preventing any axial or rotational movement by said fastener once engaged by said predetermined tool, said distal section hinged to said proximal section and having an activating surface arranged so that when force is applied to said activating surface, said distal section will pivot with respect to said proximal section, said distal section having an axis and a tip at its distal end that lies on said axis, said activating surface and said hole in said proximal section being arranged so that when an elongated activation member is passed through said hole in said proximal section, it will meet said activating surface at a location spaced farther from said axis of said distal section than if said hole and said axis of said distal section were coaxial, thereby to force said distal section to pivot with respect to said proximal section with increased offset leverage, passing said fastener through a plurality of layers to be fastened until said distal side of said head contacts a surface of one of said layers, engaging said head with said tool, providing an elongated activating member, inserting said activating member into said hole, applying force to said activating member and said tool such that said activating member is forced against said activating surface of said distal section and said tool applies an opposite force to said head such that said distal section will pivot with respect to said proximal section to lock said fastener against said layers, but said plurality of layers will not receive any substantial force on either side thereof, whereby said fastener can be used to fasten said layers without applying force to one side of said layers.

* * * * *